US012809514B2

(12) United States Patent
Lee et al.

(10) Patent No.: US 12,809,514 B2
(45) Date of Patent: Nov. 24, 2026

(54) DISPLAY DEVICE AND CONTROL METHOD THEREFOR

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 18/718,637

(22) PCT Filed: Dec. 28, 2021

(86) PCT No.: PCT/KR2021/019996
§ 371 (c)(1),
(2) Date: Jun. 11, 2024

(87) PCT Pub. No.: WO2023/127983
PCT Pub. Date: Jul. 6, 2023

(65) Prior Publication Data

US 2025/0044937 A1 Feb. 6, 2025

(51) Int. Cl.
*G06F 3/04886* (2022.01)
*H04L 65/1089* (2022.01)
(Continued)

(52) U.S. Cl.
CPC ...... *G06F 3/04886* (2013.01); *H04L 65/1089* (2013.01); *H04L 65/403* (2013.01); *G06F 2203/04803* (2013.01); *G10L 15/22* (2013.01)

(58) Field of Classification Search
None
See application file for complete search history.

(56) References Cited

U.S. PATENT DOCUMENTS

2010/0194692 A1* 8/2010 Orr .................... G06F 3/04886 345/173
2016/0112667 A1 4/2016 Park et al.
(Continued)

FOREIGN PATENT DOCUMENTS

JP 2008-191581 A 8/2008
KR 10-2015-0066138 A 6/2015
(Continued)

OTHER PUBLICATIONS

"Enhanced user interface framework for IPTV terminal devices," International Telecommunication Union, H.703, Jul. 2016, 36 pages total.

*Primary Examiner* — Duc Nguyen
*Assistant Examiner* — Assad Mohammed
(74) *Attorney, Agent, or Firm* — Birch, Stewart, Kolasch & Birch, LLP

(57) ABSTRACT

In one embodiment of the present invention, provided is a display device characterized by comprising: a microphone for receiving a user's voice; a communication unit for communicating with the outside; a display including a display area for outputting content; a motor for controlling the display to expose a portion of the display area to the outside; and a control unit for controlling the communication unit, the display, and the motor. The control unit: changes the display to one of a hidden view, a first partial view, a second partial view, or a full view; recognizes the received user's voice; changes the display to the first partial view or the second partial view and outputs the result of the voice recognition to the first partial view or the second partial view when the voice recognition is successful; and changes the display to the second partial view and outputs a virtual keyboard to the second partial view when the voice recognition fails, wherein the hidden view is a state in which the display area is not exposed to the outside, the first partial
(Continued)

view is a state in which a first area of the display area is exposed to the outside, the second partial view is a state in which a second area of the display area is exposed to the outside, and the full view is a state in which the display area is maximally exposed to the outside.

13 Claims, 19 Drawing Sheets

(51) Int. Cl.
*H04L 65/403* (2022.01)
*G10L 15/22* (2006.01)

(56) References Cited

U.S. PATENT DOCUMENTS

| | | | | |
|---|---|---|---|---|
| 2017/0103735 | A1* | 4/2017 | Oh | G06F 3/0482 |
| 2018/0199104 | A1 | 7/2018 | Park et al. | |
| 2019/0355328 | A1* | 11/2019 | Suk | G09G 3/035 |
| 2021/0182008 | A1 | 6/2021 | Kim | |
| 2021/0344560 | A1* | 11/2021 | Alameh | A61B 5/165 |
| 2022/0270594 | A1* | 8/2022 | Sejpal | G06N 3/045 |

FOREIGN PATENT DOCUMENTS

| | | | |
|---|---|---|---|
| KR | 10-2017-0050270 | A | 5/2017 |
| KR | 10-2091602 | B1 | 3/2020 |
| KR | 10-2021-0020550 | A | 2/2021 |
| WO | WO 2021/132757 | A1 | 7/2021 |

* cited by examiner (a)

(b)

DISPLAY DEVICE AND CONTROL METHOD THEREFOR

CROSS REFERENCE TO RELATED APPLICATIONS

This application is the National Phase of PCT International Application No. PCT/KR2021/019996, filed on Dec. 28, 2021, all of which is hereby expressly incorporated by reference into the present application.

TECHNICAL FIELD

The technical field of the present disclosure is a variety of multimedia devices with a display. More particularly, the present disclosure relates to a display device in which the size of an exposed display area is varied.

BACKGROUND

A display device is a device having a function of receiving, processing, and displaying an image to be viewed by a user. For example, the display device receives a broadcast selected by the user from among broadcast signals transmitted from a broadcasting station, separates an image signal from the received signal, and displays the separated image signal on the display.

Recently, due to the development of broadcasting technologies and network technologies, the functions of the display device have been significantly diversified, and the performance of the device has been improved accordingly. That is, the display device has been developed to provide not only content to be broadcast but also other various contents to the user. For example, the display device may provide game play, music appreciation, internet shopping, user customized information, and the like using various applications as well as programs received from a broadcasting station. To perform such an extended function, the display device may basically be connected to other devices or networks by using various communication protocols, and may provide a user with a ubiquitous computing environment. That is, the display device is advanced to a smart device that enables connectivity and commercial computing to the network.

In the display device according to the related art, all regions of the display are always exposed. However, when a black screen is always exposed even when a user does not watch the display device, the user is not capable of sufficiently utilizing a space.

There are no developed embodiments that vary the size of a display area exposed to the outside based on information received by a display device when the display device moves a cover or display using a motor to output images or videos in the entirety or part of the display area.

To resolve such a problem, research on a new form factor of a display device has been actively conducted.

SUMMARY

Technical Problem

An embodiment of the present disclosure is to provide a system for selectively exposing a partial region or an entire region of a display area to the outside by using a motor added to a display device.

Another embodiment of the present disclosure is to specifically define content displayed in the entirety or part of a display area to minimize power consumption of a motor added to a display device. Since motor operation is expected to consume more power than conventional display devices, defining specific content displayed in a specific mode is a crucial technology.

A further embodiment of the present disclosure is to provide a display device for automatically changing the size of a display area exposed to the outside when the display device receives an event occurrence or control signal.

Technical Solutions

According to an embodiment of the present disclosure, provided is a display device including a microphone that receives utterance of a user, a communicator that achieves communication with the outside, a display including a display area to output content, a motor that controls the display to expose a partial area of the display area to the outside, and a controller that controls the communicator, the display, and the motor, wherein the controller changes a mode of the display to one of a hidden view, a first partial view, a second partial view, and a full view, recognizes the received user's utterance, when the utterance recognition is successful, changes the mode of the display to the first partial view or the second partial view, and outputs a result regarding the utterance recognition in the first partial view or the second partial view, and when the utterance recognition fails, changes the mode of the display to the second partial view, and outputs a virtual keyboard in the second partial view, wherein the hidden view is a state where the display area is not exposed to the outside, the first partial view is a state where a first area of the display area is exposed to the outside, the second partial view is a state where a second area of the display area is exposed to the outside, and the full view is a state where the display area is maximally exposed to the outside.

The controller may, when the recognized user's utterance includes a name of a device, transmit a control signal corresponding to the recognized user's utterance to the device, change the mode of the display to the first partial view, and output a message corresponding to the control signal in the first partial view.

The controller may, when the recognized user's utterance includes a program title, search for the program title, change the mode of the display to the second partial view, and output search results in the second partial view.

The controller may receive a control signal of selecting a first search result among the search results, change the mode of the display to the full view, and output first content corresponding to the first search result in the full view.

The controller may, when the recognized user's utterance includes weather, change the mode of the display to the first partial view, output information on the weather in the first partial view, change the mode of the display to the second partial view, and output audio content related to the weather in the second partial view.

The controller may, when the recognized user's utterance includes a person's name, change the mode of the display to the first partial view, output information on the person's name in the first partial view, change the mode of the display to the second partial view, and display a content list related to the person's name in the second partial view.

The controller may, when performing a voice call with a first external terminal, change the mode of the display to the first partial view, and output voice call information in the first partial view.

The controller may, when performing a video call with the first external terminal, change the mode of the display to the second partial view, and output video call information in the second partial view.

The controller may, when performing a video conference with a plurality of external terminals, change the mode of the display to the full view, and output video conference information in the full view.

The display device may include a plurality of AI engines, and the controller may change the mode of the display to one of the first partial view, the second partial view, and the full view based on an AI engine result regarding the recognized user's utterance.

The controller may, when receiving a first message from a second external terminal, change the mode of the display to the first partial view, output the first message in the first partial view, when receiving a second message from the second external terminal after outputting the first message, change the mode of the display to the second partial view, and output the first message and the second message in the second partial view.

The controller may, when a first time period elapses after the first message and the second message are output, change the mode of the display to the hidden view.

The controller may, when a third message is received from a third external terminal after the first message and the second message are output, change the mode of the display to the hidden view, change the mode of the display to the first partial view, and output the third message in the first partial view.

The second area may be wider than the first area.

According to another embodiment of the present disclosure, provided is a method for controlling a display device including a display with a display area exposed to the outside changeable in size including changing a mode of the display to one of a hidden view, a first partial view, a second partial view, and a full view, receiving utterance of a user, recognizing the received user's utterance, when the utterance recognition is successful, changing the mode of the display to the first partial view or the second partial view, outputting a result regarding the utterance recognition in the first partial view or the second partial view, when the utterance recognition fails, changing the mode of the display to the second partial view, and outputting a virtual keyboard in the second partial view, wherein the hidden view is a state where the display area is not exposed to the outside, the first partial view is a state where a first area of the display area is exposed to the outside, the second partial view is a state where a second area of the display area is exposed to the outside, and the full view is a state where the display area is maximally exposed to the outside.

Advantageous Effects

An embodiment of the present disclosure provides a display device and a method of controlling the display device, for selectively exposing a partial region or an entire region of a display area of a display by using a motor added to a display device.

According to another embodiment of the present disclosure, the size of a portion of a display area exposed to the outside may vary depending on content.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions, or steps, disclosed in the specification, and it is also understood that greater or fewer components, functions, or steps may likewise be utilized.

Figure 1:
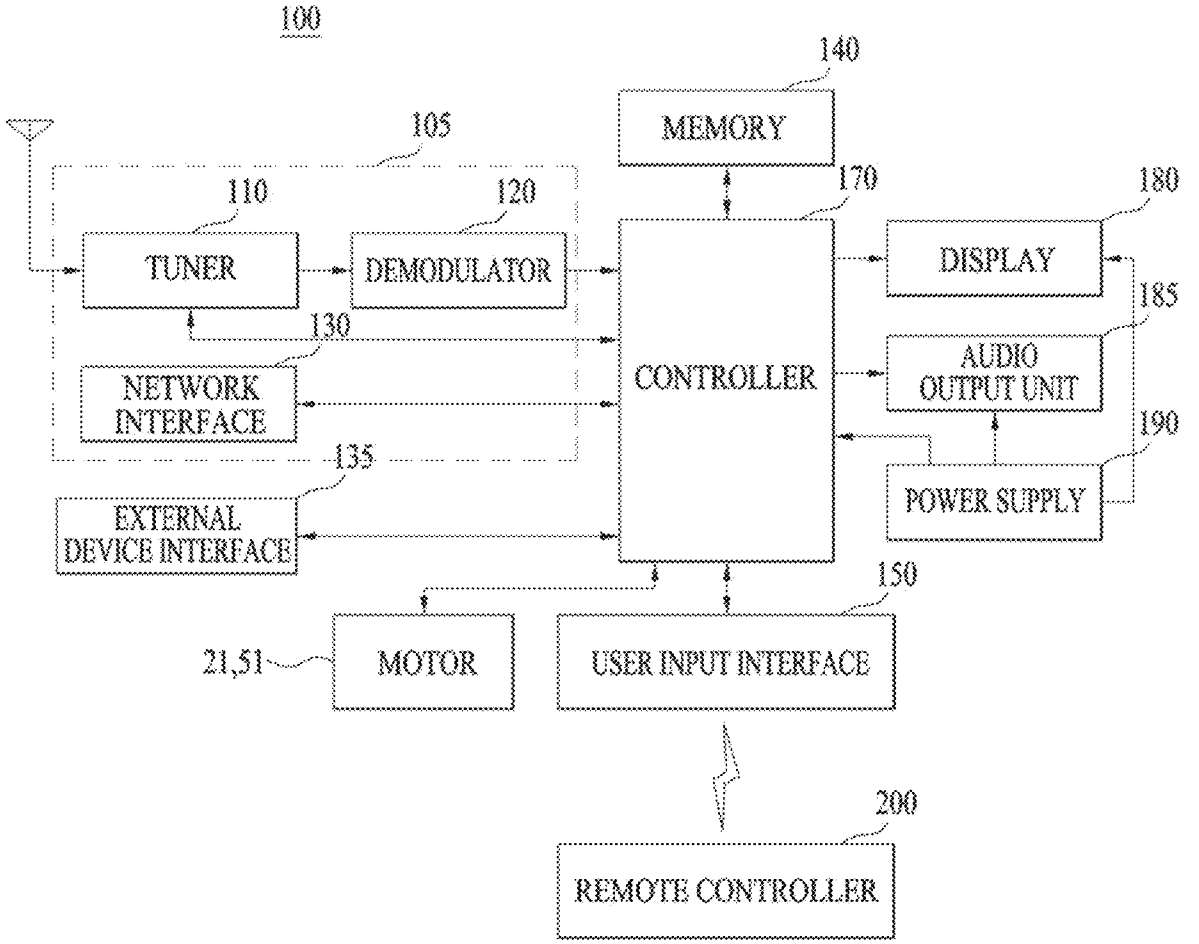
FIG. 1 is a diagram illustrating components in a display device according to an embodiment of the present disclosure.

FIG. 1 is a diagram illustrating components in a display device according to an embodiment of the present disclosure.

Referring to FIG. 1, a display device 100 may include a broadcast receiver 105, an external device interface 135, a memory 140, a user input interface 150, a controller 170, a display 180, an audio output unit 185, and a power supply 190. The components illustrated in FIG. 1 are not indispensable for implementing the display device 100, and thus the device 100 described in the specification may have more or fewer components than those listed above.

The aforementioned components are not shown in detail in the accompanying drawings, and only some important components may be illustrated in the accompanying drawings. However, although not all shown, one of ordinary skill in the art will appreciate that at least the components of FIG. 1 may be included in the display device 100 to implement functionality as a display device.

The broadcasting receiver 105 may include a tuner 110, a demodulator 120 and a network interface 130. As needed, the broadcasting receiver 105 may be configured to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal. More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170. The tuner 110 may be capable of receiving RF broadcast signals from an Advanced Television Systems Committee (ATSC) single-carrier system or from a Digital Video Broadcasting (DVB) multi-carrier system. The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120) may include a Trellis decoder (not shown), a de-interleaver (not shown) and a Reed-Solomon decoder (not shown) so as to perform Trellis decoding, de-interleaving, and Reed-Solomon decoding. For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator. The TS output from the demodulator 120 may be input to the controller 170 and thus subjected to demultiplexing and A/V signal processing. The processed video and audio signals are output to the display 180 and the audio output unit 185, respectively.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA). The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100. The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network. In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The external device interface 135 may serve as an interface between an external device and the image display device 100. For interfacing, the external device interface 135 may include an A/V Input/Output (I/O) unit (not shown) and/or a wireless communication module (not shown). The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video, and data signals from or to the external device, the external device interface 135 includes the A/V I/O unit (not shown) and/or the wireless communication module (not shown). The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100. The wireless communication module may perform short-range wireless communication with other electronic devices. For short-range wireless communication, the wireless communication module may use Bluetooth. Radio-Frequency IDentification (RFID). Infrared Data Association (IrDA). Ultra WideBand (UWB). ZigBee, and Digital Living Network Alliance (DLNA) communication standards. The external device interface 135 may be connected to various set-top boxes through at least one of the above-described ports and may thus perform an I/O operation with the various set-top boxes. The external device interface 135 may receive applications or an application list from an adjacent external device and provide the applications or the application list to the controller 170 or the memory 140.

The external device interface 135 may establish a communication network with various remote controllers 200, receive a control signal related to an operation of the display device 100 from the remote controller 200, or transmit data related to the operation of the display device 100 to the remote controller 200.

The memory 140 may store various programs necessary for the controller 170 to process and control signals, and may also store processed video, audio, and data signals. For example, the memory 140 may store application programs designed to perform various tasks to be processed by the controller 170, and may selectively provide some of the stored application programs when the controller 170 requests.

Programs stored in the memory 140 is not particularly limited as long as the programs may be executed by the controller 170. The memory 140 may temporarily store an image, a voice, or a data signal received from an external device through the network interface 130. The memory 140 may store information about a certain broadcast channel through a channel memory function such as a channel map.

The memory 140 may include at least one of a volatile memory (e.g., DRAM, SRAM, and SDRAM) or a non-volatile memory (e.g., a flash memory, a hard disk drive (HDD), and a solid state drive (SSD)).

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user. For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication. For example, the user input interface 150 may provide the controller 170 with control signals received from local keys (not shown), such as inputs of a power key, a channel key, and a volume key, and setting values. Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 typically controls the overall operation of the display device 100. The controller 170 may provide or process information or functions appropriate for a user by processing signals, data, information, and the like, which are input or output through all components illustrated in FIG. 1, or driving an application program stored in the device 100. Although not shown, the device 100 may include a substrate therein. The substrate may be a component mounted together with various electronic components, particularly, other circuits and devices that assist the various electronic components, and may be installed in a housing 10. Although not shown in detail, each of the components illustrated in FIG. 1 may be directly installed on the substrate to be controlled by the controller 170, or may be installed in the housing 10 to be electrically connected to the substrate. Accordingly, the controller 170 may be referred to as various names such as a controller and a controlling device, and may control the display device 100 and all components thereof. Accordingly, all operations and controls included in the detailed description of the present application may be considered as features of the controller 170.

The controller 170 may demultiplex the TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135. While not shown in FIG. 1, the controller 170 may include a DEMUX and a video processor.

The controller 170 may provide overall control to the image display device 100. For example, the controller 170 may control the tuner 110 to tune to an RF broadcast signal corresponding to a user-selected channel or a pre-stored channel. The controller 170 may control the image display device 100 according to a user command received through the user input interface 150 or according to an internal program. Especially the controller 170 may access a network and download an application or application list selected by the user to the image display device 100 over the network. For example, the controller 170 controls the tuner 110 to receive a signal of a channel selected according to a specific channel selection command received through the user input interface 150) and processes a video, audio and/or data signal of the selected channel. The controller 170 outputs the processed video or audio signal along with information about the user-selected channel to the display 180 or the audio output unit 185. As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture. The controller 170 may control content playback. The content may include any content stored in the image display device 100, received broadcast content, and externally input content. The content includes at least one of a broadcast image, an externally input image, an audio file, a still image, a Web page, or a text file.

If an application view menu item is selected, the controller 170 may control display of applications or a list of applications that are present in the image display device 100 or downloadable from an external network. The controller 170 may control installation and execution of an application downloaded from the external network along with various UIs. Also, the controller 170 may control display of an image related to the executed application on the display 180, upon user selection.

The controller 170 may perform control to search for a user terminal network-connected to an image display device through the network interface 130, output the searched list of user terminals through the display 180, and receive a selection signal of a user terminal used as a user controller from the list of the searched user terminals through the user interface 150.

The controller 170 may control the motors 21 and 51, and may also control the aforementioned operations of a roller 20, a cover 40 and a supporter 50 according to the control. The controller 170 may control expansion and contraction of the display 30 based on information related to deformation of a flexible display 30, sensed by a deformation sensor. That is, the controller 170 may control the motors 21 and 51, the roller 20, the cover 40, and the supporter 50 to expand and contract the display 30 according to the sensed information. The controller 170 may sense the size of an actual screen formed according to the winding or unwinding of the display 30 according to the information sensed by the size sensor. More specifically, the controller 170 may display information only on a screen of the display 30 actually exposed to the outside of the housing 10 by using the information of the size sensor. The controller 170 may turn off a portion of the display 30 hidden inside the housing 10. According to this control, the controller 170 may effectively reduce power consumption, and similarly, may effectively reduce heat generation.

To sense a gesture or movement of the user, as described above, a sensing unit (not shown) having at least one of a touch sensor, a voice sensor, a position sensor, and an operation sensor may be further provided in the display device 100. The sensing unit may include a camera to directly identify the movement of the user or another camera included in the home. The signal sensed by the sensing unit (not shown) may be transmitted to the controller 170, and the controller 170 may recognize a command by a gesture of the user by using the signal. The controller 170 may check whether the user approaches the display device 100 or whether the user is present at the home.

The display 180 may generate a driving signal by converting an image signal, a data signal, an on screen display (OSD) signal, and a control signal, which is processed by the controller 170, or an image signal, a data signal, and a control signal, which are received from the network interface 130. The display 180 may include a display panel including a plurality of pixels. The plurality of pixels included in the display panel may include subpixels of RGB. Alternatively, the plurality of pixels included in the display panel may include subpixels of RGBW. The display 180 may convert an image signal, a data signal, an OSD signal, and a control signal, which are processed by the controller 170, to generate a driving signal for the plurality of pixels.

The display 180 may be various types of displays such as a Plasma Display Panel (PDP), a Liquid Crystal Display (LCD), an Organic Light-Emitting Diode (OLED) display, a flexible display, and a 3D display. The 3D display 180 may be classified into glasses-free and glasses-based types.

The display 180 may also be a touchscreen that can be used not only as an output device but also as an input device.

The audio output unit 185 may receive a processed audio signal (e.g., a stereo signal, a 3.1-channel signal, or a 5.1-channel signal) from the controller 170 and output the received audio signal as sound. The audio output unit 185 may employ various speaker configurations.

The power supply 190 supplies power to the image display device 100. Particularly, the power supply 190 may supply power to the controller 170 which may be implemented as a System On Chip (SOC), the display 180 for displaying an image, and the audio output unit 185 for audio output. The power supply 190 may provide power to related components including the controller 170 to automatically start the operation of the display device according to an external command and a preset condition. For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The power supply 190 receives power from the outside and distributes the power to each component. The plurality of displays 180 may include a first power supply (not shown) to supply power for driving each display panel. A second power supply (not shown) to supply power to the first power supply may be provided in a main body frame (not shown).

When a wired method is used to transmit the power from the second power supply to the first power supply, the second power supply and the first power supply may be connected to each other when the display 180 is coupled to the main body frame.

To more conveniently supply power, a wireless charging method may be used. Wireless charging may be performed in a magnetic resonance manner by overlapping a pair of coils, and a charging coil may be used as the first power supply and a transmission coil may be used as the second power supply.

When power is applied to the transmission coil located in the main body frame, a current flows through the transmission coil, forms an electromagnetic field, and supplies power to each component of the display 180 while current flows through the charging coil located in the electromagnetic field formed by the transmission coil.

The remote controller 200 transmits a user input to the user input interface 150. For transmission of user input, the remote controller 200 may use various communication techniques such as Bluetooth, RF communication, IR communication, Ultra Wideband (UWB) and ZigBee. In addition, the remote controller 200 may receive a video signal, an audio signal, or a data signal from the user input interface 150 and output the received signals visually, audibly or as vibrations. For the functions described above, the remote controller 200 may include an input element such as a physical button and a touch screen.

The display device 100 may further include an image capturing unit (not shown). The image capturing unit may capture a user. The image capturing unit may be implemented by one camera, but the present disclosure is not limited thereto, and may be implemented by a plurality of cameras. The image capturing unit may be embedded in the display device 100 or separately disposed on the display 180. Image information photographed by the image capturing unit may be input to the controller 170. The controller 170 may recognize a location of the user based on the image captured by the image capturing unit. For example, the controller 170 may determine a distance (z-axis coordinate) between the user and the display device 100. The controller 170 may identify the x-axis coordinate and the y-axis coordinate in the display 180 corresponding to a user position. The controller 170 may sense a gesture of the user based on an image captured by the image capturing unit, a signal sensed by the sensor unit, or a combination thereof.

The structure of the display device 100 described above may simply control expansion and contraction of the display 30. However, to provide a more improved function, the expansion and contraction needs to be associated with a type and amount of information to be provided, which needs to be supported by appropriate control considering the structure and characteristics of the device 100. The display device 100 basically involves interaction with a user in implementing an intended function. Therefore, through optimization of various controls, the intended functional improvement may be achieved more effectively and efficiently, including improvement of user environment and user interface of the user, and furthermore, the user experience of the smart device 100, such as ease of use and convenience, may also be significantly improved.

The above-described display device 100 may be a fixed or mobile digital broadcast receiver for receiving a digital broadcast.

The block diagram of the image display device 100 illustrated in FIG. 1 is purely exemplary. Depending upon the specifications of the image display device 100 in actual implementation, the components of the image display device 100 may be combined or omitted or new components may be added.

That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Figure 2:
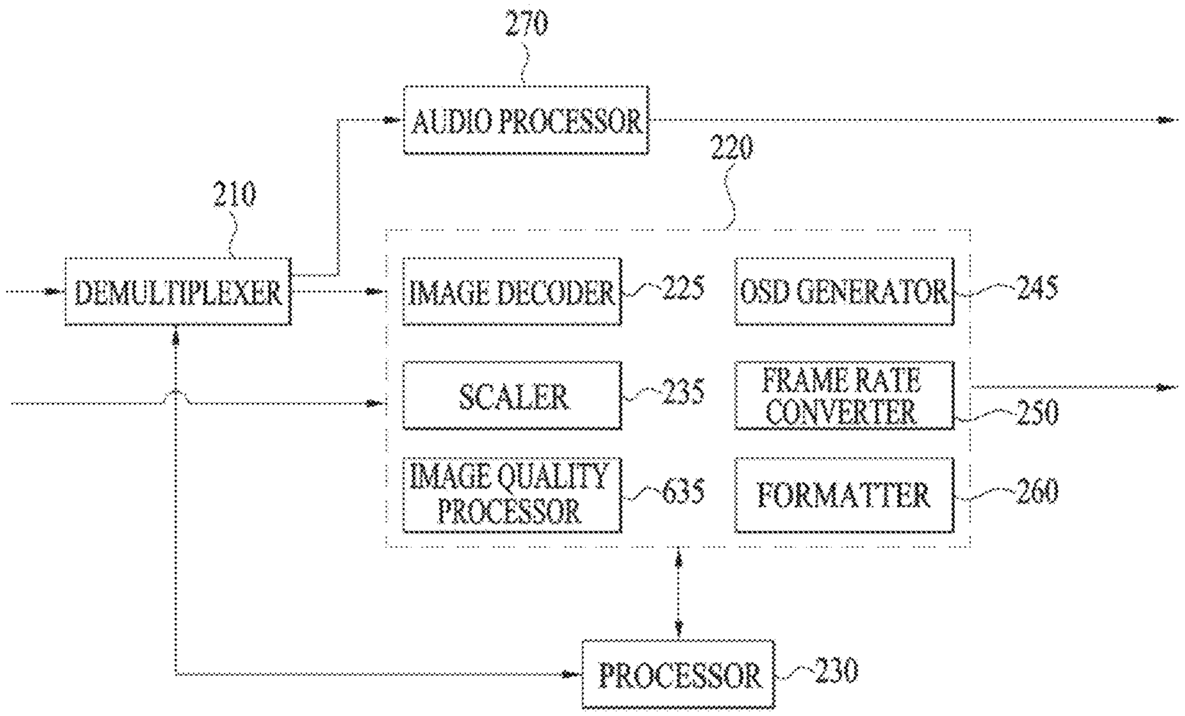
FIG. 2 is a diagram for explaining components of a controller of a display device according to an embodiment of the present disclosure.

FIG. 2 is a diagram for explaining components of a controller of a display device according to an embodiment of the present disclosure.

Referring to FIG. 2, the controller 170 according to an embodiment of the present disclosure may include a demultiplexer 210, an image processor 220, a processor 230, and/or an audio processor 270. The controller 170 may further include a data processor (not shown).

The demultiplexer 210 may demultiplex an input stream. For example, when an MPEG-2 TS is input, the MPEG-2 TS may be demultiplexed into video, audio, and data signals. The stream signal input to the demultiplexer 210 may be a stream signal output from the tuner 110, the demodulator 120, or the external device interface 130.

The image processor 220 may perform signal processing on an input image. For example, the image processor 220 may perform image processing of the demultiplexed video signal from the demultiplexer 210.

To this end, the image processor 220 may include an image decoder 225, a scaler 235, an image quality processor 635, an image encoder (not shown), an OSD generator 245, a frame rate converter 250, and/or a formatter 260.

The video decoder 225 may decode the demultiplexed video signal, and the scaler 235 may perform scaling to output the resolution of the decoded video signal from the display 180.

The image decoder 225 may include decoders of various standards. For example, the image decoder 225 may include MPEG-2 and H.264 decoders, a 3D image decoder for a color image and a depth image, and a decoder for a plurality of view images.

The scaler 235 may scale an input image signal that is completely decoded by the image decoder 225. For example, when the size or resolution of the input image signal is low; the scaler 235 may up-scale the image signal and down-scale the image signal when the size or resolution of the input image signal is high.

The image quality processor 635 may perform image quality processing on an input image signal, which is completely image-decoded by the image decoder 225. For example, the image quality processor 635 may perform noise removal processing of the input image signal, expand a resolution of a grayscale of the input image signal, improve image resolution, perform high dynamic range (HDR)-based signal processing, change a frame image rate, or perform image quality processing corresponding to the characteristics of a panel, in particular, an organic light emitting panel.

The OSD generator 245 may generate an OSD signal according to a user input or autonomously. For example, based on a user input signal, a signal for displaying various types of information on a screen of the display 180 as graphic or text may be generated. The generated OSD signal may include various data such as a user interface screen, various menu screens, widgets, and icons of the image display device 100. The generated OSD signal may include a 2D object or a 3D object.

The OSD generator 245 may generate a pointer to be displayed on a display, based on a pointing signal input from the remote controller 200. In particular, the pointer may be generated by a pointing controller, and the OSD generator 245 may include the pointing controller (not shown). Needless to say, the pointing controller (not shown) may be provided separately without being provided in the OSD generator 245.

The frame rate converter (FRC) 250 may convert a frame image rate of an input image. The frame rate converter 250 may output the frame image rate without separate frame image rate conversion.

The formatter 260 may change a format of an input image signal into an image signal for displaying an image on a display and output the image signal. In particular, the formatter 260 may change the format of the image signal to correspond to the display panel.

The processor 230 may control overall operations of the image display device 100 or the controller 170. For example, the processor 230 may control the tuner 110 to tune to an RF broadcast corresponding to a channel selected by a user or a pre-stored channel.

The processor 230 may control the image display device 100 by a user command input through the user input interface 150 or an internal program. The processor 230 may perform data transmission control with the external device interface 135 or the network interface 130. The processor 230 may control operations of the demultiplexer 210 and the image processor 220 in the controller 170.

The audio processor 270 in the controller 170 may perform voice processing of the demultiplexed audio signal. To this end, the audio processor 270 may include various decoders. The audio processor 270 in the controller 170 may process a base, a treble, and volume control.

The data processor (not shown) in the controller 170 may perform data processing on the demultiplexed data signal. For example, when the demultiplexed data signal is a coded data signal, the demultiplexed data signal may be decoded. The encoded data signal may be electronic program guide information including broadcast information such as a start time and an end time of a broadcast program broadcasted in each channel.

FIG. 2 is a block diagram of the controller 170 according to an embodiment of the present disclosure. Each component of the block diagram may be integrated, added, or omitted according to the specification of the controller 170 actually implemented. In particular, the frame rate converter 250 and the formatter 260 may be separately provided in addition to the image processor 220.

Figure 3:
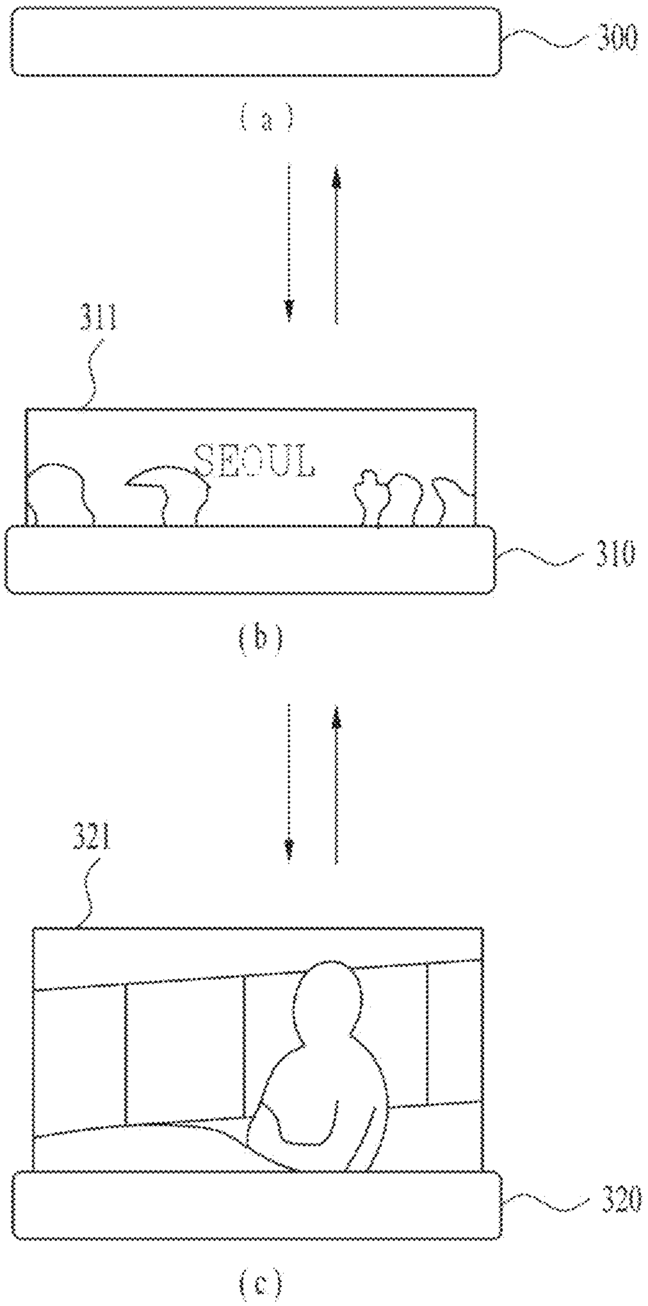
FIG. 3 is a diagram illustrating an operation of a display device according to an embodiment of the present disclosure.

FIG. 3 is a diagram illustrating an operation of a display device according to an embodiment of the present disclosure.

Unlike the related art, the display of the display device according to an embodiment of the present disclosure may be included in the housing 300, as shown in (a) of FIG. 3. When a certain condition is satisfied (for example, when a signal pressing a power button of a remote controller once is input), as shown in (b) of FIG. 3, only a partial region 311 of the display device of the display device may be exposed from the housing 310.

When another certain condition is satisfied (for example, when a signal pressing the power button of the remote controller twice is input), as illustrated in (c) of FIG. 3, an entire region 321 of the display of the display device may be designed to be exposed from the housing 320. Needless to say, a mode in (c) of FIG. 3 may be switched to a mode in (b) and a mode in (a) in a reverse direction, and the mode in (b) may be skipped.

To implement this, the displays 311 and 321 of the display device may include a material for forming a flexible display. For example, a bendable or rollable flexible display material may be for a plastic OLED (POLED or P-OLED), and may be finished with a colorless polyimide (CPI) film, which is a plastic material. Here, the CPI film is for a transparent but rigid plastic material like glass, may freely change a shape, and may not easily break even a pressure is applied.

The displays 311 and 321 may be wound around rollers inside the housings 310 and 320 and then unfolded, and a motor for driving the rollers may be required. This will be described below in more detail with reference to FIG. 6.

To be distinguished from the related art, a display device designed as shown in FIG. 3 may be defined as a rollable display device or a flexible display device, a mode illustrated in (a) of FIG. 3 may be defined as a zero view, a mode illustrated in (b) of FIG. 3 may be defined as a partial view or a line view, and a mode illustrated in (c) of FIG. 3 may be defined as a full view.

Figure 4:
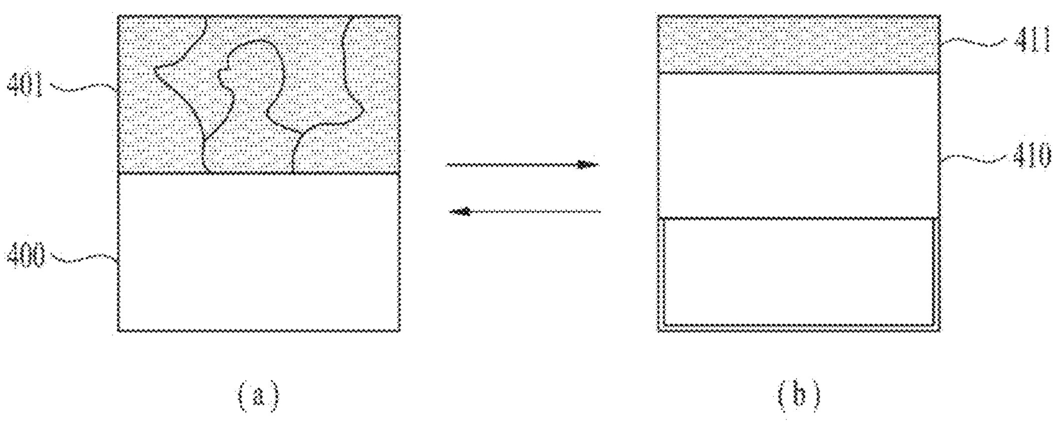
FIG. 4 is a diagram illustrating an operation of a display device according to another embodiment of the present disclosure.

FIG. 4 is a diagram illustrating an operation of a display device according to another embodiment of the present disclosure.

Although it has been described with reference to FIG. 3 that a flexible display material is used for a display of the display device, the display device may not necessarily include a material for a flexible display, and a display of a general display device may be used without change in the embodiment of FIG. 4.

However, differently from the related art, as shown in (a) of FIG. 4, covers 400 having the same size or similar sizes may be positioned under the display 401 of the display device. When a certain condition is satisfied (for example, when a signal pressing a power button of a remote controller once is input), as shown in (b) of FIG. 4, a cover 410 may be designed to move in an up direction to expose only a partial region of a display 411 of the display device. Needless to say, a mode in (a) of FIG. 4 may be switched to a mode shown in (a) of FIG. 4. To freely move the cover shown in FIG. 4 in an up/down direction, a motor may be designed to be positioned around the cover.

To be distinguished from the related art, the display device designed as shown in FIG. 4 may be defined as an Atelier TV, a mode illustrated in (a) of FIG. 4 may be defined as a full view, and a mode illustrated in (b) of FIG. 4 may be defined as a line view or a partial view.

In an embodiment of the present disclosure, as shown in (b) of FIG. 4, the display device may define a line view state as a default mode. That is, unlike FIG. 3, the display device of FIG. 4 may have a line view state rather than a zero view as a default.

Figure 5:
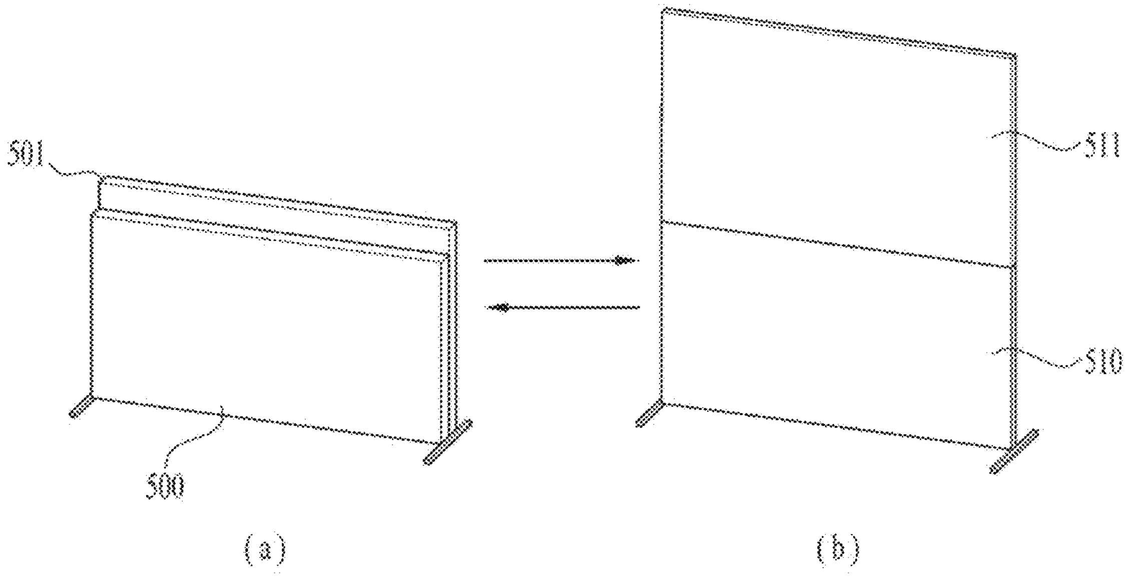
FIG. 5 is a diagram for explaining an operation of a display device according to another embodiment of the present disclosure.

FIG. 5 is a diagram for explaining an operation of a display device according to another embodiment of the present disclosure.

Similar to FIG. 4, a material for a flexible display may not necessarily be used as a display of a display device, and a general display may be used without change. However, differently from FIG. 4, the display of the display device other than a cover itself is moved.

For example, as shown in (a) of FIG. 5, the cover 500 having the same size or similar sizes is designed to be positioned under the display 501 of the display device. A display 501 and the cover 500 of the display device may be apart from each other at a certain interval to prevent friction from being generated. When a certain condition is satisfied (for example, when a signal pressing a power button of the remote controller once is input), as illustrated in (b) of FIG. 5, the display 511 of the display device may move in an up direction to design the entire region of the display 511 of the display device to be exposed. In this case, differently from FIG. 4, a cover 510 may not move.

Needless to say, in a mode of (b) of FIG. 5 may be switched to a mode of (a) of FIG. 5. To freely move the displays 501 and 511 of the display device shown in FIG. 5 in an up/down direction, a motor may be designed around the displays 501 and 511 of the display device.

To be distinguished from the related art, a display device designed as shown in FIG. 5 may be defined as an interior TV, a mode illustrated in (a) of FIG. 5 may be defined as a partial view or a line view, and a mode illustrated in (b) of FIG. 5 may be defined as a full view.

In an embodiment of the present disclosure, as shown in (a) of FIG. 5, the display device may define a partial view state as a default mode. That is, unlike FIG. 3, the display device of FIG. 5 may have a partial view state rather than a zero view as a default.

Figure 6:
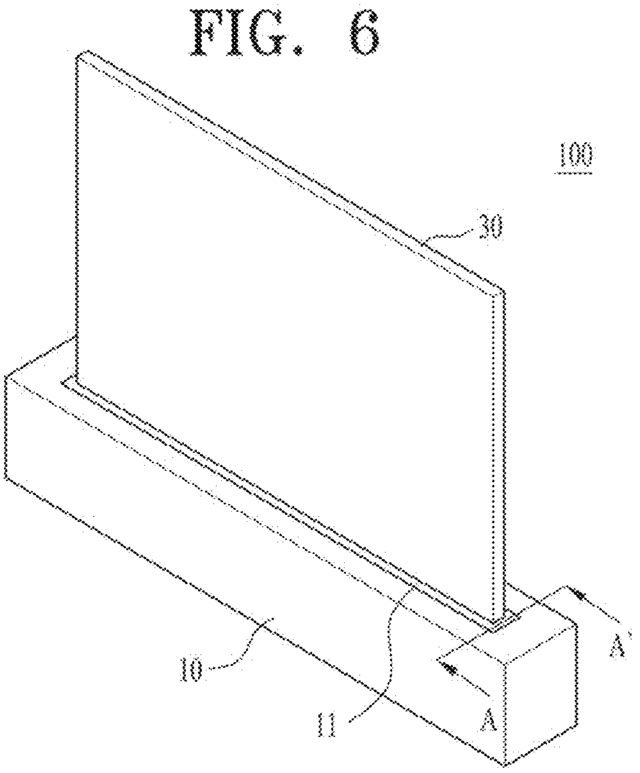
FIG. 6 is a diagram for explaining a motor for adjusting a size of an exposed display region of a display device according to an embodiment of the present disclosure.
Figure 6:
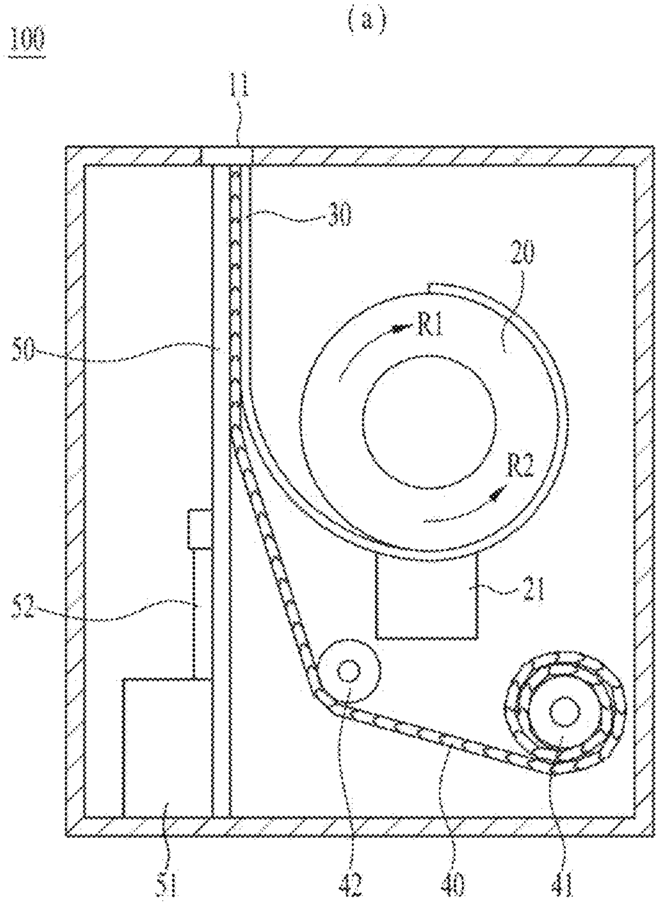

FIG. 6 is a diagram for explaining a motor for adjusting a size of an exposed display region of a display device according to an embodiment of the present disclosure.

Although the motor is applicable to the embodiments of FIGS. 4 and 5, it is assumed that the motor is applied to the display device of FIG. 3 for convenience of description, and FIG. 6 will be described.

(a) of FIG. 6 illustrates a screen of the housing and the display device shown in FIG. 3 in a diagonal direction. (b) of FIG. 6 is a cross-sectional view taken along a line A-A' of (a) of FIG. 6.

As shown in (a) of FIG. 6, the display device 100 may further include the housing 10.

The housing 10 may be configured to accommodate various components, and more particularly, the housing 10 may accommodate, for example, the display 30 and various electronic components for operating the display 30.

As shown in (b) of FIG. 6, the display device 100 may include the roller 20 rotatably installed in the housing 10. Although not shown, the roller 20 may include sleeves formed at both ends, and the sleeves may be rotatably supported with respect to the housing 10 by bearings.

The roller 20 may be connected to the motor 21 installed in the housing 10, and may rotate in a clockwise direction R1 or a counterclockwise direction R2 as illustrated by the motor 21. To adjust a rotation speed of the roller 20, a gear train may be located between the motor 21 and the roller 20.

The display device 100 may include the display 30 configured to display various contents and information related to the contents. For example, the display 30 may display video content, audio content, and other ancillary content. Such contents include various pieces of information associated thereto, for example, a play back time in a video content, a title of the content, and the like, and the display 30 may also display such relevant information. The display 30 may include at least one of a liquid crystal display (LCD), a thin film transistor-liquid crystal display (TFT-LCD), an organic light-emitting diode (OLED) display, a flexible display, a three-dimensional (3D) display, an e-ink display.

In detail, although not shown in detail, the display 30 may include a display module and a window covering the display module. The display module may constitute a display device such as an LCD or an OLED as described above, and may be a component that actually displays image information. The window may be located on a portion exposed to a user of the display module, that is, a front surface in terms of the drawing, and may protect the display module from the outside. In addition to such a protection function, the window needs to allow information displayed on the display module to be shown to the user through the window. Accordingly, the window may include a material having appropriate strength and transparency. The display module may be directly attached to a rear surface of the window. The display module may be directly attached to the window in various ways, and an adhesive may be most conveniently used for direct attachment.

The display 30 may include a touch sensor (not shown) for sensing a touch on the display 30 to receive a control command by a touch method. The content which is input in a touching manner may be a text or a numerical value, or a menu item to be indicated or designated in various modes. The touch sensor may be configured in the form of a film having a touch pattern to be located between the window and the display module, or may include a metal wire which is patterned directly on a rear surface of the window. Alternatively, the touch sensor may be integrally formed with the display module. For example, the touch sensor may be located on a substrate of the display module or may be provided inside the display module. As such, the display 30 may form a touch screen together with the touch sensor, and in this case, the touch screen may function as a user input unit. According to the complex configuration of the display 30, the display 30 is displayed as a single module or an assembly including a plurality of layers, that is, components.

The display 30 may be accommodated in the housing 10 as illustrated in such a manner that the display device 100 may have a compact structure. To accommodate the display 30 in the housing 10, the display 30 needs to be basically deformed. Accordingly, the display device 100 may use a flexible display as the display 30.

The display 30 may include a flexible display to be deformable by an external force. The deformation may be at least one of bending, curving, folding, twisting, and rolling of the display 30. A typical flexible display is manufactured on a thin flexible substrate to be bent, curved, folded, twisted, or rolled, such as paper, while maintaining the characteristics of the existing flat panel display described above, and thus may not easily break. The flexible display 30 may be combined with a touch sensor as described above to implement a flexible touch screen.

Due to this deformable property, as shown in (b) of FIG. 6, the display 30 may be rolled on the roller 20. The display 30 may be wound around the roller 20 or unwound from the roller 20 according to a rotation direction of the roller 20. The display 30 may be unwound from the roller 20 and project or roll out to the outside of the housing 10. On the contrary, the display 30 may be wound around the roller 20 to retract/roll in the housing 10. In detail, as shown in (b) of FIG. 6, when the roller 20 rotates in a clockwise direction R1, the display 30 may be unwound from the roller 20 and be expanded to the outside of the housing 10 through an opening 11 formed in the housing 10.

Therefore, as described above, a screen accommodated in the housing 300 in (a) of FIG. 3 may be extended to the outside of the housing 310 as shown in (b) of FIG. 3, and a screen 311 having a certain size may be formed. When the roller 20 further rotates in the clockwise direction R1, the display 30 may be further unwound from the roller 20. Therefore, as shown in (c) of FIG. 3, the screen may protrude to a larger size outside the housing 10, and may form a screen of a larger size. When the roller 20 rotates in the counterclockwise direction R1, the display 30 may be wound around the roller 20 and may be contracted into the housing 10 through the opening 11. Accordingly, as shown in (b) of FIG. 3, the screen 321 of (c) of FIG. 3 may be contracted to have a relatively smaller size inside the housing 310, thereby forming a smaller screen. When the roller 20 further rotates counterclockwise R2, the display 30 may be further wound around the roller 20. Therefore, as shown in (a) of FIG. 3, the screen may not protrude to the outside of the housing 300, and may be completely accommodated in the housing 300. As described above, the display device 100 may control expansion of the display 20 to a required size, thereby forming a screen of a desired size. When the display device 100 is not in use, the display 20 may be completely accommodated in the housing 10, and the display device 100 may have a compact structure because the display device 100 is expanded only in a required size. As a result, the size of the screen formed on the display 20 may vary according to winding and unwinding of the flexible display 20.

Although not shown, the display device 100 may include a deformation sensor for sensing deformation of the flexible display 30. The deformation sensor may be provided in the flexible display 30 or the housing 10 to detect information related to deformation of the flexible display 30. Here, the information related to the deformation may include a direction in which the flexible display 20 is deformed, a degree of deformation, a deformation position, a deformation time, and an acceleration in which the deformed flexible display 30 is restored, and may further include various information to be sensed by bending of the flexible display 30.

A front portion of the display 30, which is expanded from the display device 100, may be protected by the window, while a rear portion of the display 30 may be exposed. The display 30 includes sensitive electronic components and substrates, and thus the display 30 needs to be properly protected to prevent malfunction. Accordingly, as illustrated in (b) of FIG. 6, the display device 100 may include the cover 40 configured to cover the rear portion of the extended display 30.

The cover 40 may include a plurality of links connected to each other. The link may have a width corresponding to a width of the display 30, and the links connected to each other, that is, the cover 40, may form a single plate covering the rear portion of the display 30. Any one of the links is pivotable with respect to another adjacent link, and thus as shown in the drawing, the cover 40 may be wound around a first roller 41 and may be guided to a rear side of the display 30 by the second roller 42.

When the display 30 is expanded during an operation of the display device 100, the first roller 41 may rotate to unwind the cover 40. The unwound cover 40 is guided by the second roller 41 and is attached to the rear portion of the display 30. Accordingly, the cover 40 may be extended to the outside of the housing 10 together with the display 30 to protect the rear portion of the display 30.

When the display 30 is contracted, the first roller 41 may rotate in an opposite direction to separate the cover 40 from the display 30, and the separated cover 40 may be guided by the second roller 42 to be wound around the first roller 41. In the cover 40, the first roller 41 may be driven by the motor 21 together with the roller 20, and a separate motor for driving the first roller 41 may be installed in the housing 10.

The display 30 may be difficult to maintain an expanded state due to the flexibility thereof. Accordingly, the display device 100 may include the supporter 50 configured to support the extended display 30. The supporter 50 may be extended to the outside of the housing 10 through the opening 11 by the motor 51 and the auxiliary supporter 52 connected thereto. Accordingly, the supporter 50 may be extended to the outside of the housing 10 together with the display 30. Accordingly, the display 30 expanded by the supporter 50 may be stably supported to display content to the user.

Figure 7:
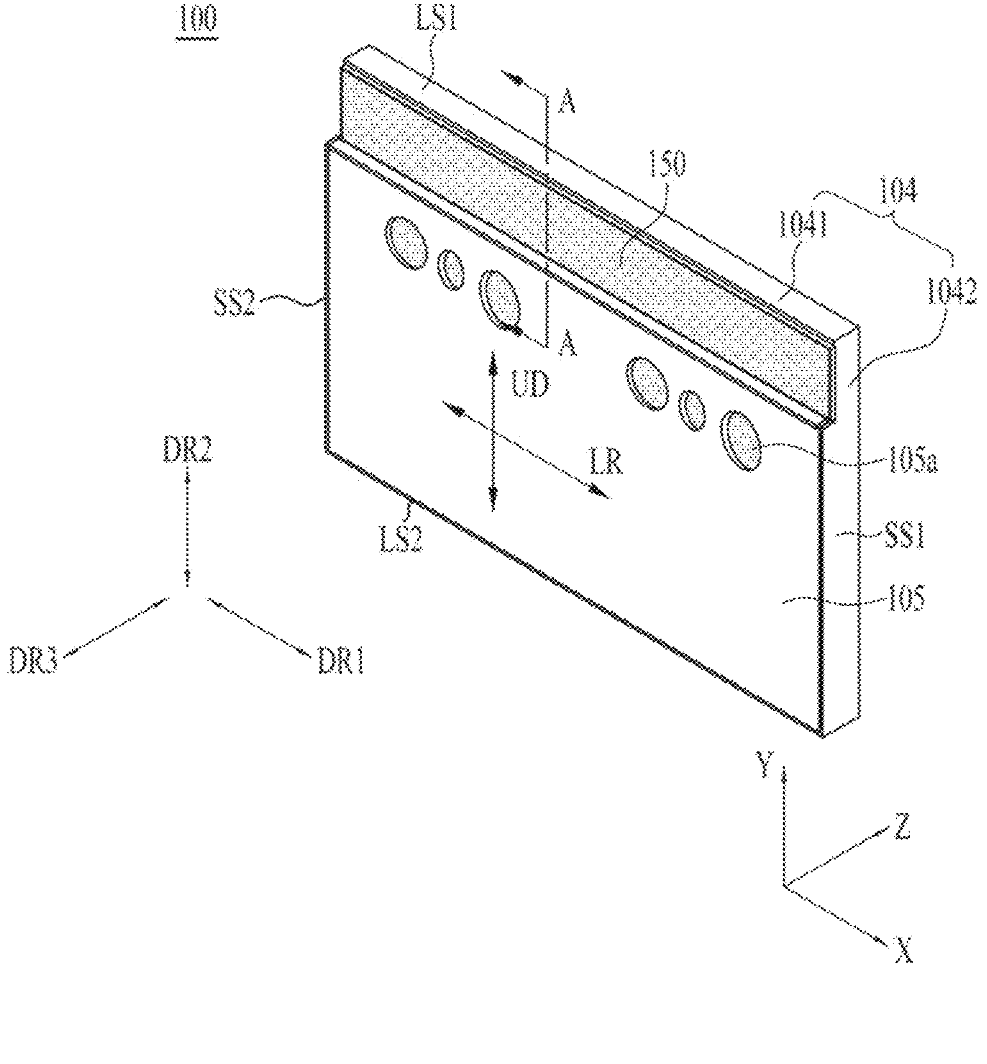
FIGS. 7 and 8 are perspective views illustrating a display device according to an embodiment of the present disclosure.
Figure 8:
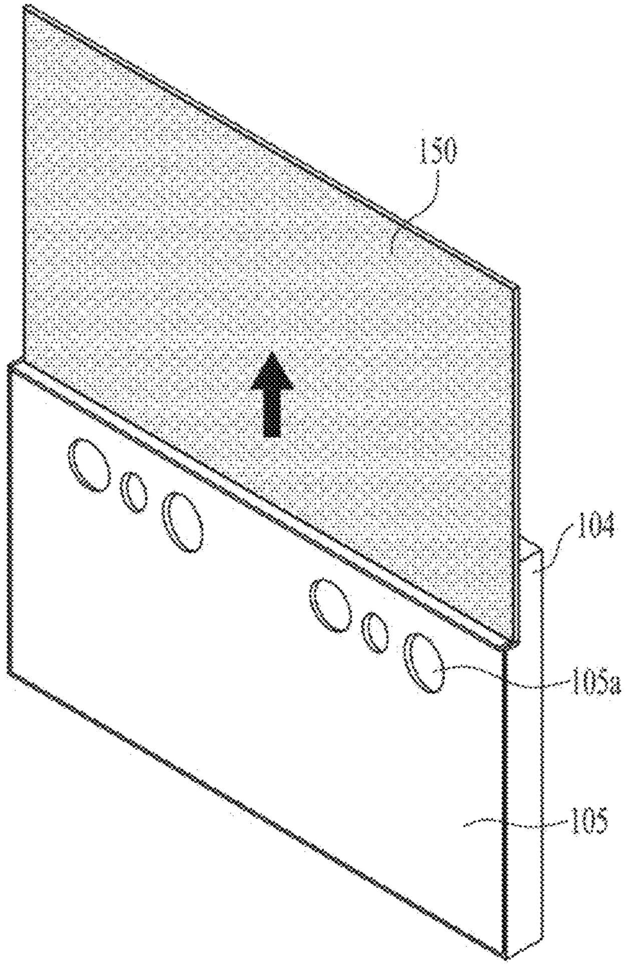

FIGS. 7 and 8 are perspective views illustrating a display device according to an embodiment of the present disclosure.

Referring to FIG. 7, a display device 100 may have a rectangular shape including a first long side LS1, a second long side LS2 facing the first long side LS1, a first short side SS1 adjacent to the first long side LS1 and the second long side LS2, and a second short side SS2 facing the first short side SS1.

Here, the first short side SS1 may be referred to as a first side area, the second short side SS2 may be referred to as a second side area facing the first side area, the first long side LS1 may be referred to as a third side area adjacent to the first side area and the second side area and located between the first side area and the second side area, and the second long side LS2 may be referred to as a fourth side area adjacent to the first side area and the second side area, located between the first side area and the second side area, and facing the third side area.

Although the lengths of the first and second long sides LS1 and LS2 are illustrated to be greater than the lengths of the first and second short sides SS1 and SS2 for convenience of description, the lengths of the first and second long sides LS1 and LS2 may be approximately the same as those of the first and second short sides SS1 and SS2.

In the following description, a first direction DR1 may be parallel to the long sides LS1 and LS2 of the display device 100, and a second direction DR2 may be parallel to the short sides SS1 and SS2 of the display device 100. A third direction DR3 may be a direction perpendicular to the first direction DR1 and/or the second direction DR2.

In another aspect, a side toward which the display device 100 displays an image may be referred to as a front side or a front side. When the display device 100 displays an image, a side toward which an image is not capable of being observed may be referred to as a rear side or a rear surface. When the display device 100 is viewed from the front side or front surface, a side at the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device 100. Points at which the first long side LS1, the second long side LS2, the first short side SS1, and the second short side SS2 intersect with each other may be referred to as corners. Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an upward and downward direction UD.

The display device includes a display module 150 occupying most of a front surface and housing 102, 104, and 105 covering a rear surface, a lateral surface, and the like of the display module 150 and packaging the display module 150.

Recently, the display device 100 may use the display module 150 that is to be flexible, such as light emitting didoes (LEDs) or organic light emitting diodes (OLEDs) to implement a curved screen on a plane.

An LCD mainly used in the related art receives light through a backlight unit because the LCD is difficult to emit light by itself. The backlight unit is a light source and is a device for uniformly supplying light supplied from the light source to a liquid crystal positioned on a front surface. Although the backlight unit is gradually thinner and a thin LCD is implemented, it is difficult to implement the backlight unit with a flexible material, and when the backlight unit is bent, it is difficult to uniformly supply light to liquid crystal, thereby changing the brightness of a screen.

On the other hand, in the case of an LED or an OLED, each element constituting a pixel emits light by itself, and thus a backlight unit is not used and the display module 150 may be implemented to be bent. Each element is self-emitting, and thus the display module 150 may be implemented to be bent using an LED or an OLED because the brightness of each element is not affected even though a positional relationship between neighboring elements is changed.

An organic light emitting diode (OLED) panel is mainly registered in the middle of 2010, thereby rapidly replacing an LCD in a small-sized display market. The OLED display is a display made using a self-light emitting phenomenon that light is emitted when a current flows in a fluorescent organic active material, and there is almost no afterimage when an image quality reaction rate is faster than the LCD.

The OLED uses three types of phosphor organic compounds such as red, green, and blue having a self-emission function and is a light emitting display product using a phenomenon in that electrons injected from a negative electrode and a positive electrode and positive electric charges are combined in an organic material to emit light by itself, and thus there is no need for a backlight (backlight device) that deteriorates color.

A LED panel is a technology that uses one LED element as one pixel, and implements the display module 150 to be bent by reducing the size of an LED element compared to a conventional LED element. In a conventional LED TV, an LED is used as a light source of a backlight unit for supplying light to an LCD, and the LED itself dese not constitute a screen.

The display module includes a display panel, a coupling magnet disposed on a rear surface of the display panel, a first power supply, and a first signal module. The display panel may include a plurality of pixels R, G, and B. The plurality of pixels R. G, and B may be formed in each region in which a plurality of data lines and a plurality of gate lines cross each other. The plurality of pixels R, G, and B may be located or arranged in a matrix form.

For example, the plurality of pixels R, G, and B may include a red color (R) sub-pixel, a green color (G) sub-pixel, and a blue color (B) sub-pixel. The plurality of pixels R, G, and B may further include a white color (W) sub-pixel.

A side of the display module 150, which displays an image, may be referred to as a front side or a front surface. When the display module 150 displays the image, a side of the display module 150, from which the image is not observed, may be referred to as a rear side or a rear surface.

In the display device 100 according to the present disclosure, the size of a screen of the display module 150, which is exposed to the outside, may be changed by moving the display module 150 in upward and downward directions. FIG. 7 shows a basic mode in which the display module 150 is exposed to the minimum. FIG. 8 may correspond to an extension mode in which the display module 150 is exposed to the maximum. The display module 150 may be switched to the extension mode from the basic mode while being drawn out to the outside in multiple stages.

For convenience of description, a screen located inside the housings 102, 104, and 105 is referred to as a first region and a screen exposed to the outside is referred to as a second region. The sizes of the first region and the second region may vary.

In the basic mode, the size of the first region is maximum, and the size of the second region is minimum, and in the extension mode, the size of the second region is maximum.

The display module 150 may also include the second region exposed to the outside in the basic mode, and the size of a rear cover 102 in a rear direction may be larger than a front cover 105 located in a front direction in correspondence to the size of the second region exposed in the basic mode. That is, in the basic mode, the size of the second region may correspond to a size difference between the front cover 105 and the rear cover 102.

When the sizes of the front cover 105 and the rear cover 102 are different from each other, a supporting force for supporting the display module 150 may be ensured while the display module 150 is drawn out upward, and simultaneously, an area of the front surface may be utilized to the maximum. When the front cover 105 and the rear cover 102 have the same size, a lower space of the display module 150 may not be utilized, thereby reducing the size of an actually available screen.

For example, when the height of the front cover 105 is 60 cm and the height of the rear cover 102 is 70 cm, the size of the display module 150 may have a size corresponding to the size of the rear cover 102, and thus the display module 150 of 70 cm may be mounted and the size of the second region may correspond to 70 cm in the extension mode. Even when most of the display module 150 is exposed to the outside of the front cover 105, the rear cover 102 supports the rear cover 102, and thus an entire region of the display module 150 may be utilized.

When the heights of the front cover 105 and the rear cover 102 are the same at 60 cm, and about 10 cm of the display module 150 needs to be within the housing in consideration of the supporting force even when the maximum size of the display module 150 is 60 cm and the display module 150 is drawn out to the outside. Therefore, the size of an actual available screen is reduced to 50 cm.

When the heights of the front cover 105 and the rear cover 102 are formed at 70 cm, the size of the display module 150 may be 70 cm, but it is not possible to expose an entire portion of the display module 150 to the outside, and thus the size of an actually available screen is only 60 cm.

In the display device 100 in which the front cover 105 and the rear cover 102 have the same size, to obtain a screen with 70 cm in the extension mode, the size of the housing needs to be 80 cm. In this case, when a user sits on a sofa, the display device 100 is higher than an eye level, making it inconvenient to use the display device 100.

Therefore, when the rear cover 102 is larger than the front cover 105 as in the present disclosure, a screen having a size larger than the size of the front cover 105 may be provided.

The housings 105, 104, and 102 defining an outer appearance of the display device 100 may include the front cover 105 located on a front surface, the rear cover 102 located on a rear surface, and the side cover 104 defining a lateral surface. The front cover 105 and the rear cover 102 have different sizes, and thus a step difference may be formed between the front cover 105 and the rear cover 102, and a first opening through which the display module 150 is drawn in and out may be located at a position at which the step difference is formed.

When the display module 150 is completely inserted into the first opening, the first opening may be exposed, but the display module 150 according to the present disclosure may maintain a state of being inserted into the first opening, thereby minimizing an inflow of foreign substances through the first opening.

The display module according to the present disclosure may be drawn in and out of the housing according to the present disclosure, and thus when the display module 150 is not used (basic mode), the second region may be minimized to prevent a black screen from being exposed to the outside while the display module 150 is not used.

In the basic mode, environment information such as a clock, a temperature, and humidity may be output to the second region exposed at an upper portion to be easily checked by a user. When a notification is generated in a linked mobile terminal or home appliance, an icon for displaying the notification may be output.

When an alarm designated by the user is generated or an important notification is generated, the second region may be expanded and sufficient information may be provided to the user. The user may easily recognize occurrence of the notification through movement of the display module 150.

As illustrated in FIGS. 7 and 8, the front cover 105 may include a second opening 105*a*. A shape of the second opening may have a large size as shown in FIG. 2 and include a size for outputting information through the second opening or may obtain a lighting effect through a fine hole.

Figure 9:
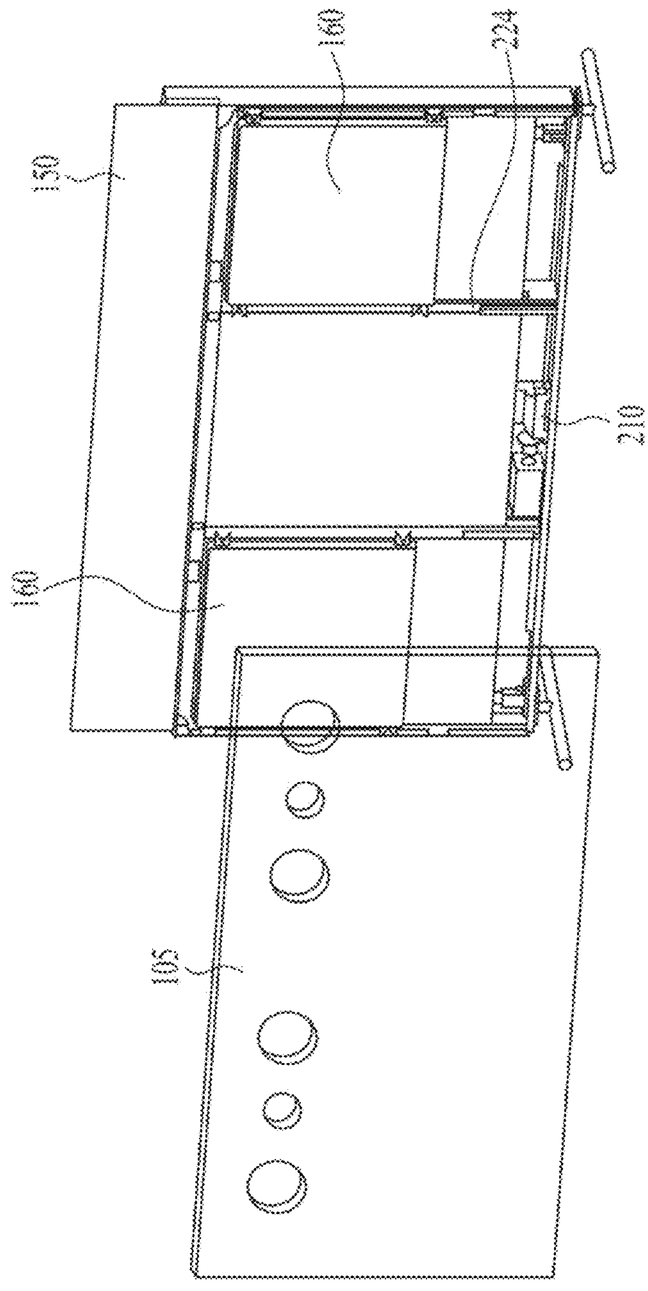
FIG. 9 is a diagram showing a front surface illustrating a state in which a front cover of a display device is removed, according to an embodiment of the present disclosure.

FIG. 9 is a diagram showing a front surface illustrating a state in which a front cover of a display device is removed, according to an embodiment of the present disclosure.

As illustrated in FIG. 9, an audio output unit 160 may be located on a front surface of the display module 150 to output sound through the second opening 105*a*.

Recently, as the thickness of the display device 100 becomes thinner, it tends to use a separate sound output device such as a sound bar or a home theater, but the sound output device occupies an indoor space, and it is difficult for a user to connect the sound output device, and thus inconvenience occurs when the user uses the sound output device.

The audio output unit located in a rear direction of the display device 100 is located opposite to the user, and thus the efficiency of sound output may be degraded, but the sound quality may be improved when the audio output unit is disposed to face the front surface as in the present disclosure.

To fix the audio output unit 160, the audio output unit 160 may be further included on a front surface of the display module 150, and to output surround sound, a pair of audio output units 160 may be provided on the left and the right as shown in FIG. 4, and when a woofer is further provided, the audio output unit 160 may be further placed in a lower portion of the center.

When only listening of music proceeds through the audio output unit 160, as shown in FIG. 7, in the basic mode in which the display module 150 is accommodated, an icon or information required for listening to music may be output to the second region. For example, a title of the music being played and a name of a singer may be displayed or a cover image of an album may be displayed in the second region.

When the display module 150 is drawn out to the maximum as shown in FIG. 8, the display module 150 may move in accordance with an eye level of the user, and the size of the screen exposed to the outside may vary according to the size of the screen to be displayed.

Figure 10:
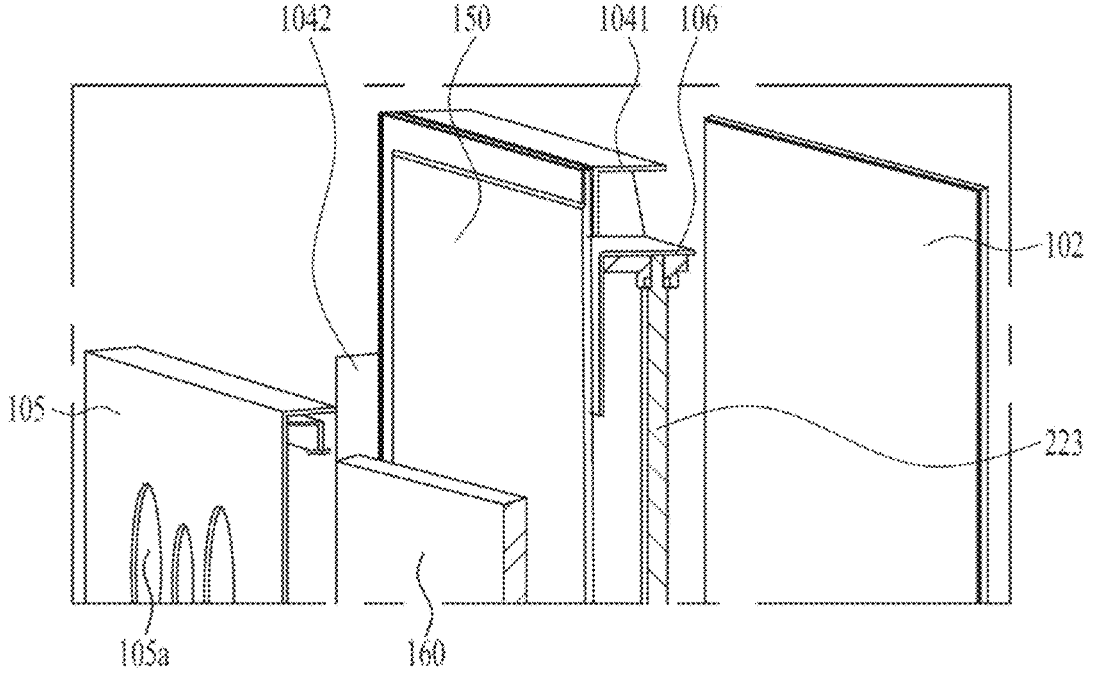
FIG. 10 is an exploded perspective view of a cross section of a display device taken along a line A-A of FIG. 7, according to an embodiment of the present disclosure.

FIG. 10 is an exploded perspective view of a cross section of a display device taken along a line A-A of FIG. 7, according to an embodiment of the present disclosure.

Referring to FIG. 10, the audio output unit 160 may be located between the front cover 105 and the display module 150, and an electronic component such as a circuit board and a driving integrated circuit (IC) as a controller for controlling the display module 150 and the audio output unit 160 may be mounted between the display module 150 and the rear cover 102.

The display device may further include the side cover 104 to ensure an installation space on a rear surface of the display module 150. The side cover 104 may include an upper cover 1041 located on a rear surface of the display module 150 and located above the rear cover 102, and a lateral cover 1042 located at the left and right sides of the display module 150.

The upper cover 1041 and the lateral cover 1042 may define an outer appearance of the display device 100 together with the front cover 105 and the rear cover 102. The upper cover 1041 and the lateral cover 1042 may be integrated with each other or may be configured by connecting straight covers.

The upper cover 1041 is located only on the rear surface of the display module 150, and thus the width of the upper cover 1042 is small, and as shown in FIG. 7, the length of the lateral cover 1042 in a rear direction corresponds to the size of the rear cover 102, and the length of the lateral cover 1042 in a front direction corresponds to the size of the front cover 105, and accordingly, a step difference may be formed at an upper portion of the lateral cover 1042.

Hereinafter, specific embodiments of the display device described above with reference to FIGS. 1 to 10 will be described.

In an embodiment of the present disclosure, the display device will be described as performing various embodiments, such as changing a mode of the display to one of a hidden view; a first partial view, a second partial view, and a full view, but such operations are able to be individually controlled by the controller and respective modules described above. However, for convenience of description, such operations will be described as being performed by the display device.

In addition, the display device to be described in the embodiments of FIGS. 11 to 20 below corresponds to an embodiment in which the display is moved by the motor described above in FIGS. 5 to 10 and a display area exposed to the outside changes. However, in one example, the display device may also be applied to an embodiment in which the display area exposed to the outside changes as the cover is moved by the motor described above in FIGS. 3 and 4.

Further, for convenience of description, in the embodiments of FIGS. 11 to 20, the hidden view may be defined to be a state in which the display area is not exposed to the outside, the first partial view may be defined to be a state in which a first area of the display area is exposed to the outside, the second partial view may be defined to be a state in which a second area of the display area is exposed to the outside, and the full view may be defined to be a state in which the display area is maximally exposed to the outside. In this regard, the second area is wider than the first area. In other words, the second partial view has the display area exposed to the outside wider than that of the first partial view. Additionally, the hidden view may include a state in which the display area is minimally exposed to the outside. However, this may be determined based on a manufacturer.

Additionally, the embodiments of FIGS. 11 to 20 assume a state in which communication between the display device 100 and the outside is available. In this regard, the display device 100 may transmit and receive content to and from the outside by being connected to the various set-top boxes via at least one of the various terminals described above. However, for convenience of description, hereinafter, it is assumed that the display device 100 is in the state of being able to be in communication with the outside and transmits and receives information including an image, a video, and metadata using various means.

Additionally, in the embodiments of FIGS. 11 to 20, the display device 100 may include a microphone (not shown) that receives a user's utterance. The microphone is for an input of an audio signal and is able to process an acoustic signal from the outside into electrical utterance data. The display device 100 may utilize the utterance data received from the microphone in various ways depending on a function in progress.

Figure 11:
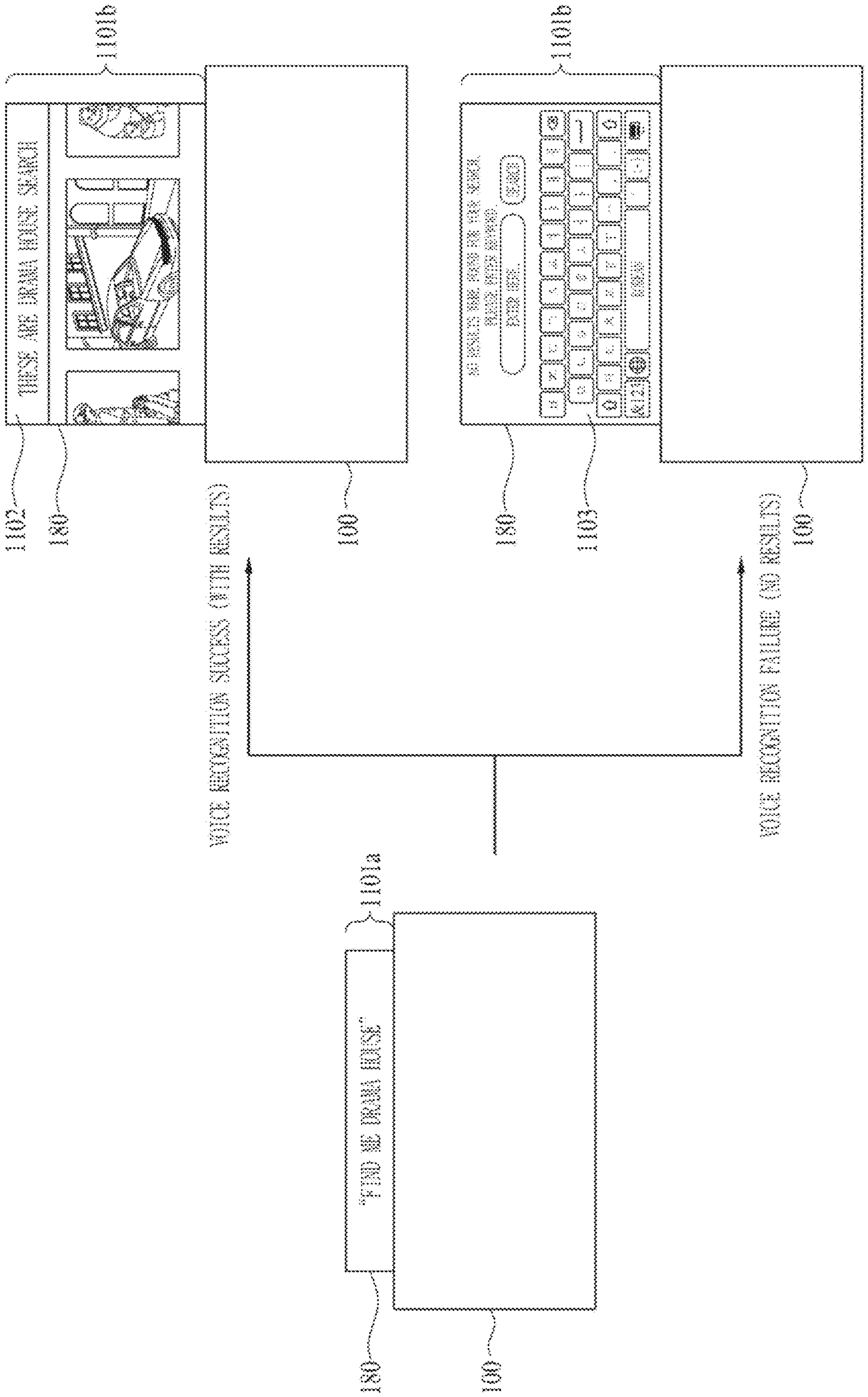
FIG. 11 is a diagram illustrating an embodiment of outputting an utterance recognition result in a display device according to an embodiment of the present disclosure.

FIG. 11 is a diagram illustrating an embodiment of outputting an utterance recognition result in a display device according to an embodiment of the present disclosure.

Referring to FIG. 11, when recognizing the user's utterance, the display device 100 may change a mode of the display 180 to a first partial view 1101*a*. The display device 100 may output text corresponding to the recognized user's utterance in the first partial view 1101*a*.

For example, the user may utter "Find the penthouse", and the display device 100 may output text corresponding to the recognized user's utterance in the first partial view 1101*a*.

In an embodiment of the present disclosure, when the utterance recognition is successful, the display device 100 may change the mode of the display 180 to one of the first partial view 1101*a*, a second partial view 1101*b*, and a full view (not shown). Thereafter, the display device 100 may output an utterance recognition result 1102 in one of the first partial view 1101*a*, the second partial view 1101*b*, and the full view. In this regard, the display device 100 may determine one of the first partial view 1101*a*, the second partial view 110*b*, and the full view based on the utterance recognition result 1102.

On the other hand, when the utterance recognition fails, the display device 100 may change the mode of the display 180 to the second partial view 1101*b*. Thereafter, the display device 100 may output a virtual keyboard 1103 in the second partial view 1101*b*. Accordingly, when not recognizing the user's utterance, the display device 100 may output the virtual keyboard 1103 to receive a keyword.

Figure 12:
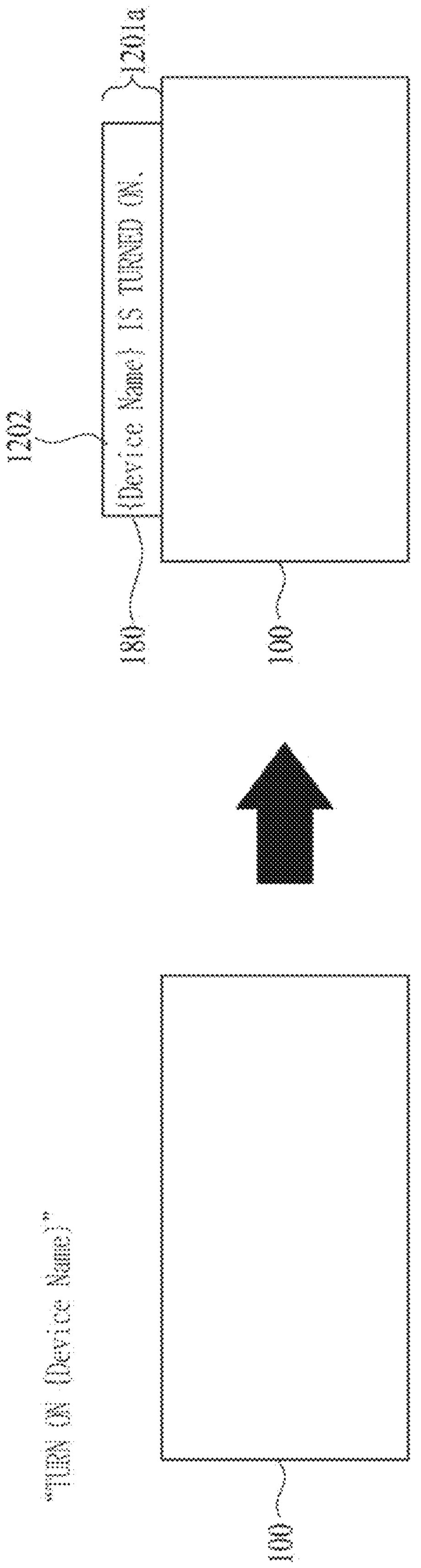
FIG. 12 is a diagram illustrating an embodiment of recognizing a user's utterance in a display device according to an embodiment of the present disclosure.

FIG. 12 is a diagram illustrating an embodiment of recognizing a user's utterance in a display device according to an embodiment of the present disclosure. Hereinafter, a description of content that is redundant with the above-mentioned content will be omitted.

Referring to FIG. 12, the display device 100 may recognize the user's utterance including a device name. In this regard, the mode of the display 180 of the display device 100 may correspond to the hidden view state.

In an embodiment of the present disclosure, the display device 100 may transmit a control signal corresponding to the recognized user's utterance to the device included in the user's utterance. For example, when the recognized user's utterance is "Turn on the air conditioner", the display device 100 may transmit a "turn on" signal to an "air conditioner". In other words, home appliances recently used indoors (a TV, an air conditioner, an air purifier, a refrigerator, a washing machine, and the like) may be connected to each other as Internet of Things (IoT) devices. In this case, the display device 100 closest to the user may recognize the user's utterance and control another connected IoT device.

Thereafter, the display device 100 may change the mode of the display 180 to a first partial view 1201*a* and output a message 1202 corresponding to the control signal in the first partial view 1201*a*, in the example described above, the display device 100 may output a message "The air conditioner is turned on" in the first partial view 1201*a*.

Figure 13:
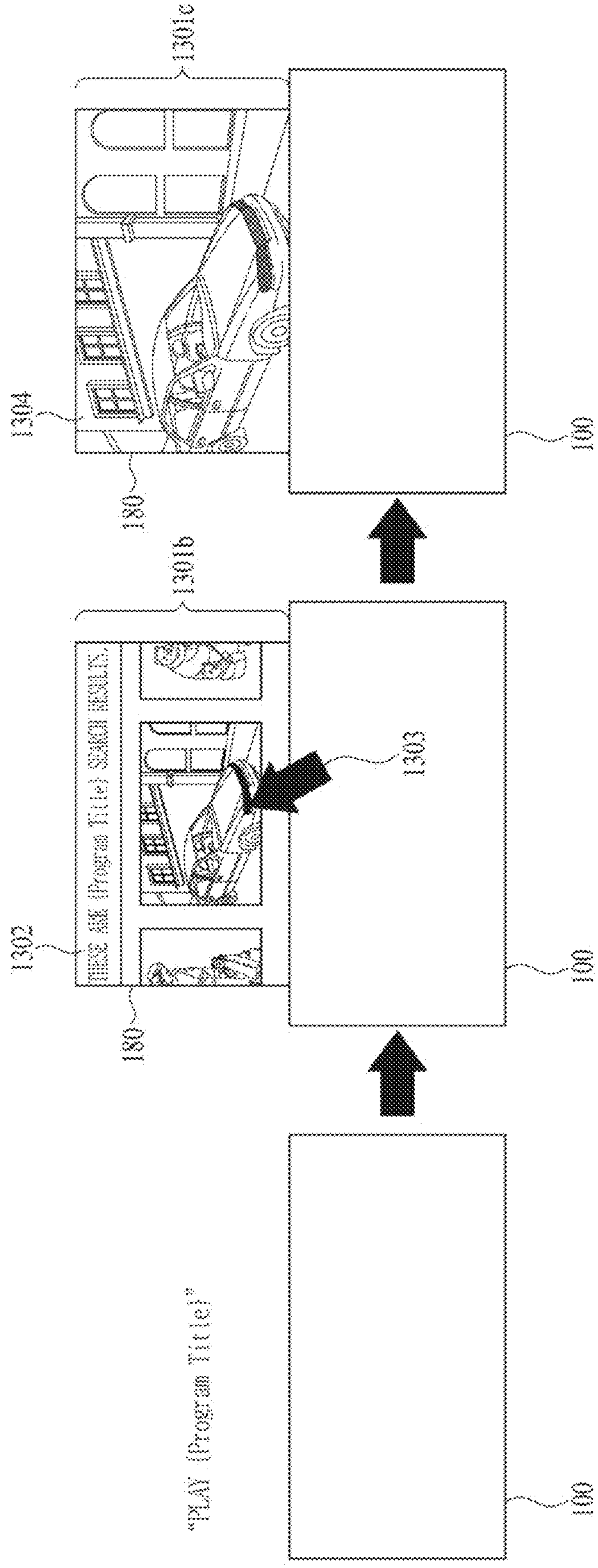
FIG. 13 is a diagram illustrating another embodiment of recognizing a user's utterance in a display device according to an embodiment of the present disclosure.

FIG. 13 is a diagram illustrating another embodiment of recognizing a user's utterance in a display device according to an embodiment of the present disclosure. Hereinafter, a description of content that is redundant with the above-mentioned content will be omitted.

Referring to FIG. 13, the display device 100 may recognize a user's utterance including a program title. In this regard, the mode of the display 180 of the display device 100 may correspond to the hidden view state.

The display device 100 may search for the program title when the recognized user's utterance includes the program title. In this regard, the display device 100 may search for the program title on a connected external server.

In an embodiment of the present disclosure, the display device 100 may change the mode of the display 180 to a second partial view 1301*b*. The display device 100 may output search results 1302 in the second partial view 1301*b*. More specifically, the display device 100 may output the search results 1302 for the program title in the second partial view 1301*b*. In this regard, the display device 100 may change the mode of the display 180 to a first partial view (not shown) or the second partial view 1301*b* based on an amount of the search results 1302. For example, the display device 100 may output a thumbnail of at least one video content as the search results 1302 for the program title.

In an embodiment of the present disclosure, the display device 100 may receive a control signal 1303 of selecting a first search result among the search results 1302. In this regard, the control signal 1303 may correspond to a control signal 1303 received from a remote control device. That is, the user may select the first search result among the search results 1302 using the remote control device.

The display device 100 may change the mode of the display 180 to a full view 1301*c* based on the control signal 1303 and output first content 1304 corresponding to the first search result in the full view 1301*c*. in the example described above, the display device 100 may output the first content 1304 based on the control signal 1303 of selecting a thumbnail of the first content output as the search results 1302. In this regard, when the first content 1304 is the video content, the display device 100 may immediately play the first content 1304.

Figure 14:
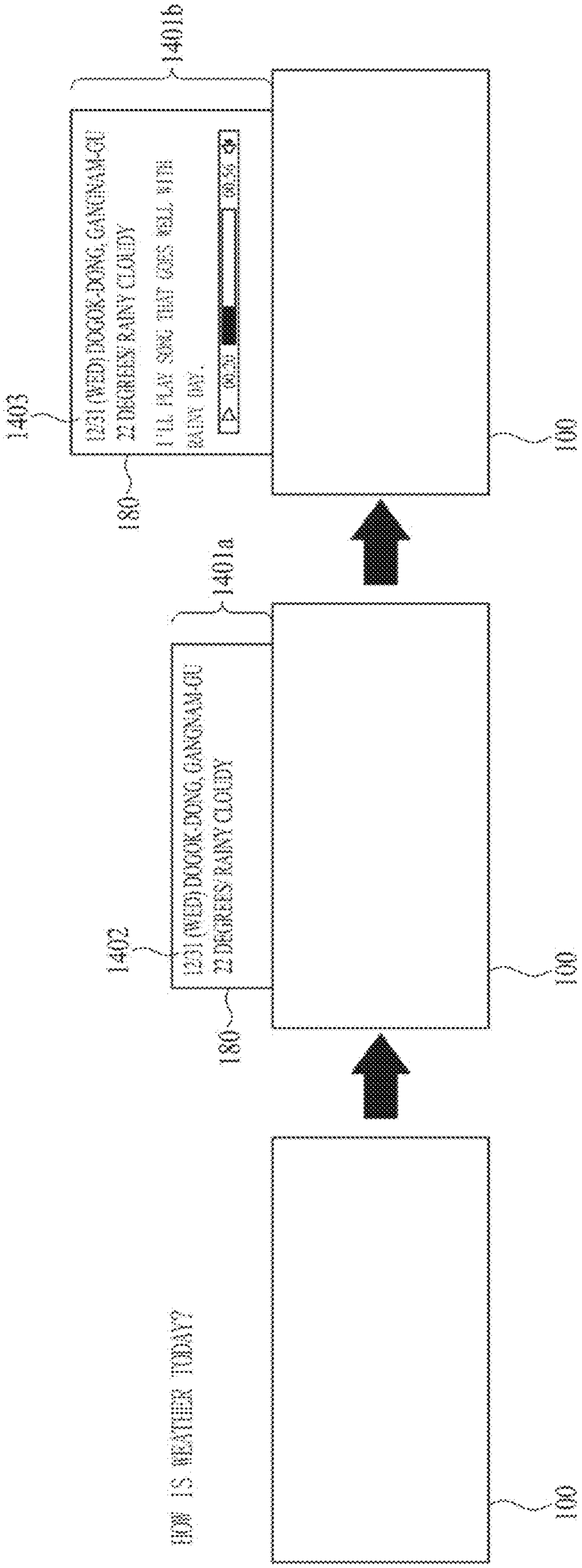
FIG. 14 is a diagram illustrating another embodiment of recognizing a user's utterance in a display device according to an embodiment of the present disclosure.

FIG. 14 is a diagram illustrating another embodiment of recognizing a user's utterance in a display device according to an embodiment of the present disclosure. Hereinafter, a description of content that is redundant with the above-mentioned content will be omitted.

Referring to FIG. 14, the display device 100 may recognize a user's utterance including a date and a weather. When the recognized user's utterance includes the date and the weather, the display device 100 may search for information on the date and the weather. For example, the user may utter "How is the weather today?" and the display device 100 may recognize the date "today" and the word "weather."

In an embodiment of the present disclosure, the display device 100 may change the mode of the display 180 to a first partial view 1401*a* and output information 1402 on the date and the weather in the first partial view 1401*a*. In this regard, the information 1402 on the date and the weather may include location information of the corresponding display device 100, date information, and weather information. For example, the display device 100 may output the "weather" information of the "region" for the date "today" searched for externally in the first partial view 1401*a*. To this end, the display device 100 may provide the location information to the outside.

After a first time period elapses, the display device 100 may change the mode of the display 180 to a second partial view 1401*b*. Additionally, the display device 100 may output the information 1402 on the date and the weather, then receive an arbitrary control signal from the remote control device, and then change the mode of the display 180 to the second partial view 1401*b*.

In an embodiment of the present disclosure, the display device 100 may output audio content 1403 related to the weather in the second partial view 1401*b*. More specifically, the display device 100 may search for the audio content 1403 related to the weather. For example, recent web browsers or audio applications provide the audio content 1403 related to the weather. The display device 100 may receive the audio content 1403 related to the weather via the web browser or the audio application and output the audio content in the second partial view 1401*b*.

Figure 15:
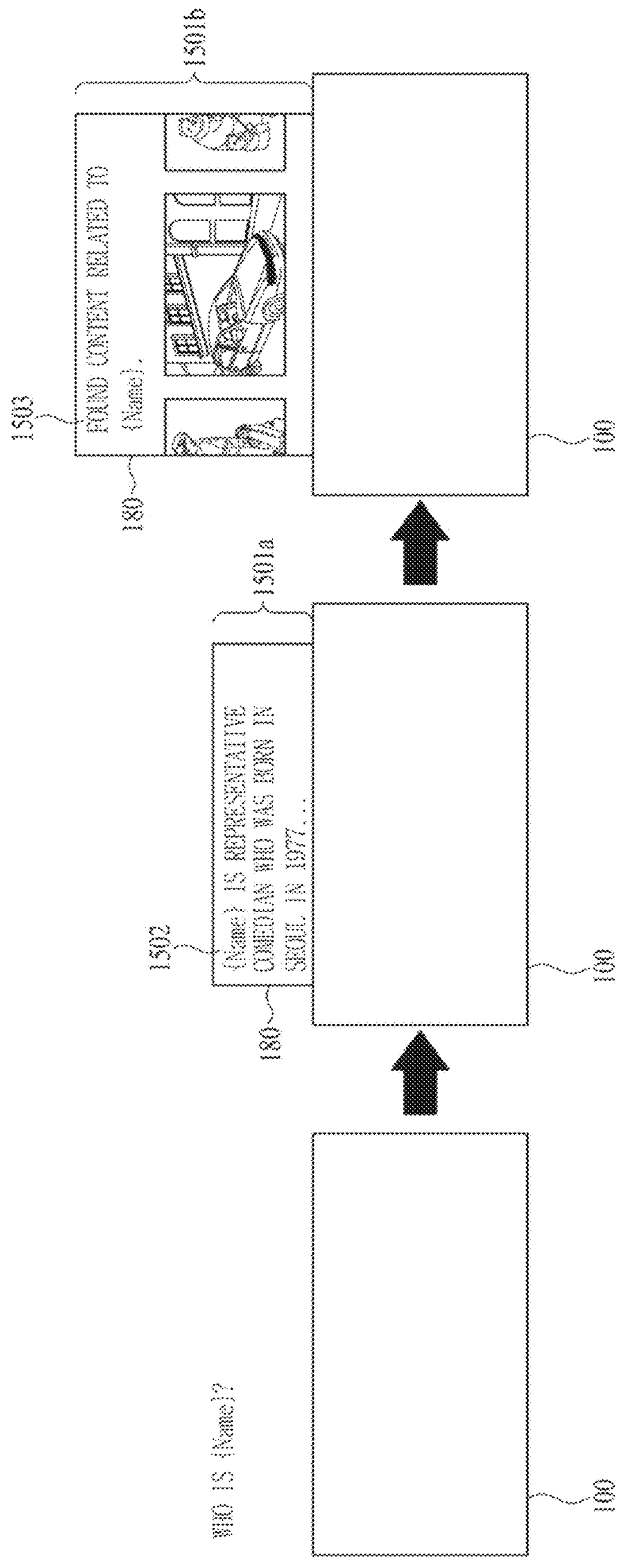
FIG. 15 is a diagram illustrating another embodiment of recognizing a user's utterance in a display device according to an embodiment of the present disclosure.

FIG. 15 is a diagram illustrating another embodiment of recognizing a user's utterance in a display device according to an embodiment of the present disclosure. Hereinafter, a description of content that is redundant with the above-mentioned content will be omitted.

Referring to FIG. 15, the display device 100 may recognize a user's utterance including a person's name. The display device 100 may search for information on the person's name when the recognized user's utterance includes the person's name. For example, the user may utter "Who is Yoo Jae-seok?", and the display device 100 may recognize the word like "Yoo Jae-seok".

In an embodiment of the present disclosure, the display device 100 may change the mode of the display 180 to a first partial view 1501*a* and output information 1502 on the person's name in the first partial view 1501*a*. In this regard, the display device 100 may output the searched information 1502 on the person's name as it is.

In an embodiment of the present disclosure, the display device 100 may change the mode of the display 180 to a second partial view 1501*b* after the first time period elapses. Additionally, the display device 100 may output the information 1502 on the person's name, then receive an arbitrary control signal from the remote control device, and then change the mode of the display 180 to the second partial view 1501*b*.

The display device 100 may output a content list 1503 related to the person's name in the second partial view 1501*b*. More specifically, the display device 100 may search for content related to the person's name and output the searched list 1503 in the second partial view 1501*b*. Although not shown in the drawing, the display device 100 may change the mode of the display 180 to a full view (not shown) based on a control signal of selecting first content from the content list 1503 related to the person's name, and output the first content in the full view.

Figure 16:
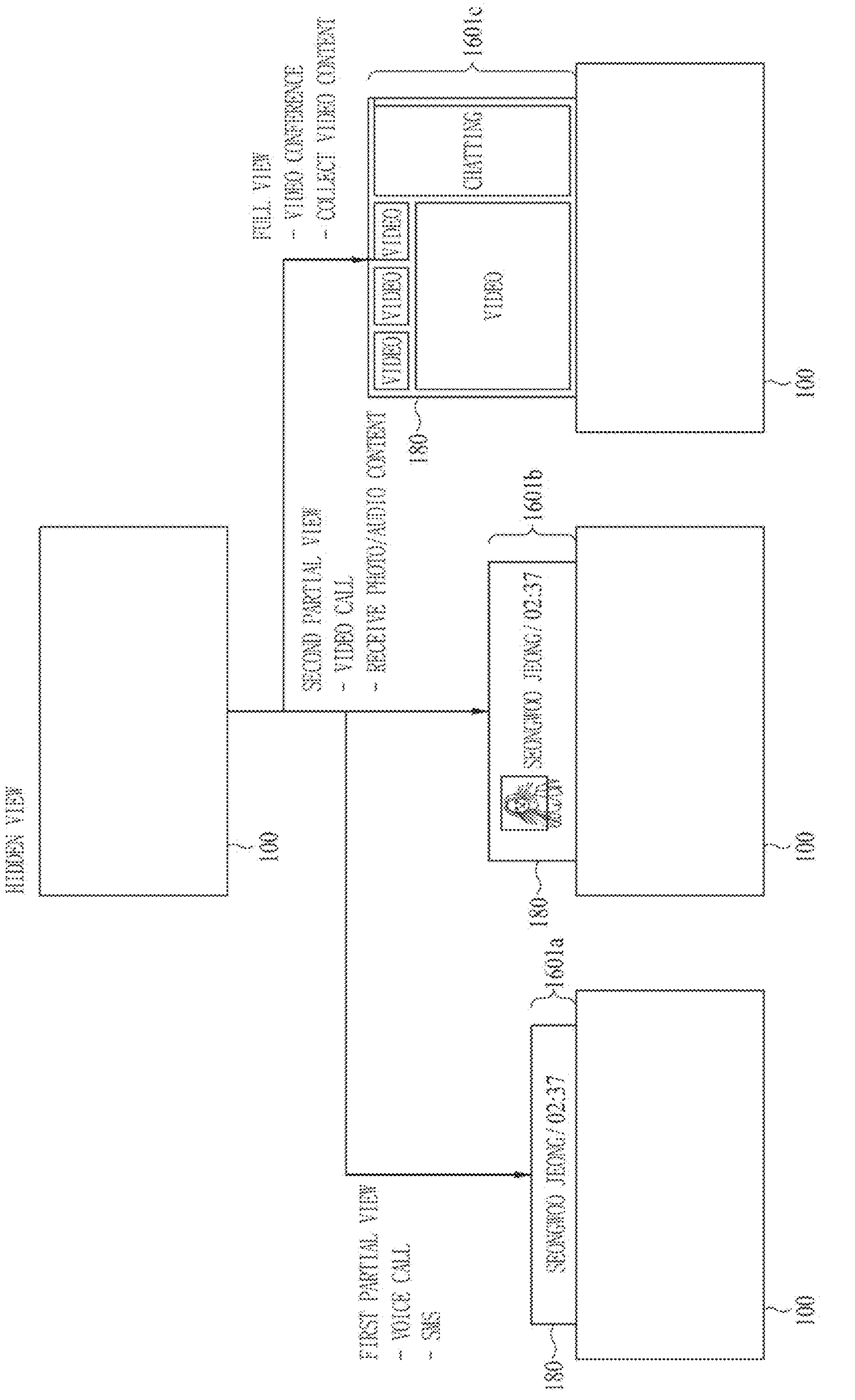
FIG. 16 is a diagram illustrating an embodiment in which a display device according to an embodiment of the present disclosure is in communication with an external terminal.

FIG. 16 is a diagram illustrating an embodiment in which a display device according to an embodiment of the present disclosure is in communication with an external terminal. Hereinafter, a description of content that is redundant with the above-mentioned content will be omitted.

Referring to FIG. 16, the display device 100 may be in various communications with an external terminal (not shown). More specifically, the display device 100 may perform a voice call, a video call, a video conference, and the like with the external terminal. Accordingly, the display device 100 may change a size of the display 180 to an appropriate size. In this regard, the display device 100 may assume that the mode of the display 180 is a hidden view.

In an embodiment of the present disclosure, when performing the voice call with the external terminal, the display device 100 may change the mode of the display 180 to a first partial view 1601*a* and output voice call information in the first partial view 1601*a*. The display device 100 may output information on the external terminal, a voice call time, and the like as the voice call information in the first partial view 1601*a*.

In addition, in an embodiment of the present disclosure, when receiving a text message (SMS), an instant message, or the like from the external terminal, the display device 100 may change the mode of the display 180 to the first partial view 1601*a*, and output message information in the first partial view 1601*a*.

In an embodiment of the present disclosure, when performing the video call with the external terminal, the display device 100 may change the mode of the display 180 to a second partial view 1601*b* and output video call information in the second partial view 1601*b*. The display device 100 may output the information on the external terminal, a video filmed via a camera of the external terminal, a video call time, and the like as the video call information in the second partial view 1601*b*. To this end, the display device 100 may receive the video filmed via the camera of the external terminal from the external terminal.

In addition, when receiving photo or audio content from the external terminal, the display device 100 may change the mode of the display 180 to the second partial view 1601*b* and output the received photo or audio content in the second partial view 1601*b*.

In an embodiment of the present disclosure, when performing the video conference with a plurality of external terminals, the display device 100 may change the mode of the display 180 to a full view 1601*c* and output video conference information in the full view 1601*c*. The display device 100 may output information on the participating external terminals, a chat window, a video conference time, and the like as the video conference information in the full view 1601*c*.

Additionally, when receiving video content from the external terminal, the display device 100 may change the mode of the display 180 to a full view 1601*c* and output the video content in the full view 1601*c*.

Figure 17:
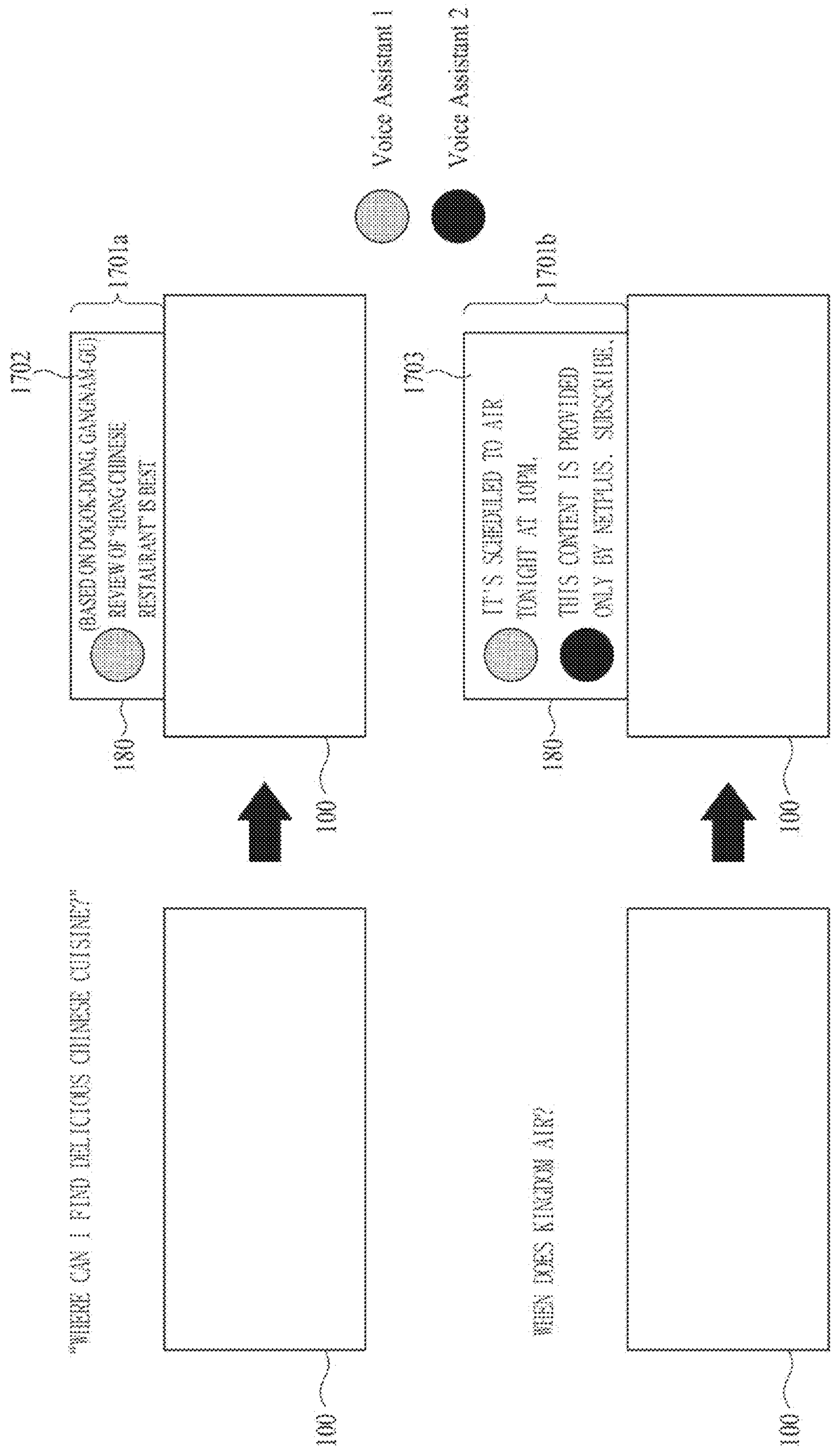
FIG. 17 is a diagram illustrating an embodiment of using a plurality of AI engines in a display device according to an embodiment of the present disclosure.

FIG. 17 is a diagram illustrating an embodiment of using a plurality of AI engines in a display device according to an embodiment of the present disclosure. Hereinafter, a description of content that is redundant with the above-mentioned content will be omitted.

Referring to FIG. 17, the display device 100 may include a plurality of AI engines. In this regard, the display device 100 may be connected to the plurality of AI engines. For example, the display device 100 may be connected to a first AI engine (e.g., google assistance) and a second AI engine (e.g., ThinQ).

In an embodiment of the present disclosure, the display device 100 may recognize a user's utterance and query the plurality of included or connected AI engines regarding the recognized user's utterance.

When receiving a result regarding the recognized user's utterance from the AI engine, the display device 100 may change the mode of the display 180 to one of a first partial view 1701*a*, a second partial view 1701*b*, and a full view (not shown) based on the result.

More specifically, the display device 100 may recognize a user's utterance, "Where can I find delicious Chinese cuisine?". The display device 100 may query the plurality of AI engines regarding the recognized user's utterance. In this case, the first AI engine among the AI engines may derive a first result 1702 regarding the recognized user's utterance. On the other hand, the second AI engine is not able to derive the result regarding the recognized user's utterance. Accordingly, the display device 100 may change the mode of the display 180 to the first partial view 1701*a* and output the first result 1702 received via the first AI engine in the first partial view 1701*a*.

Additionally, the display device 100 may recognize a user's utterance, "When does Kingdom air?". The display device 100 may query the plurality of AI engines regarding the recognized user's utterance. In this case, the first AI engine and the second AI engine among the AI engines may derive a second result 1703 regarding the recognized user's utterance. Accordingly, the display device 100 may change the mode of the display 180 to the second partial view 1701*b* and output the second result 1703 received via the first AI engine and the second AI engine in the second partial view 1701*b*.

In other words, the display device 100 may use the various AI engines independently or by being connected to the outside. Such AI engine may recognize the user's utterance, then analyze the user's utterance via an AI algorithm, and then output a more elaborate result value. The display device 100 may change a size of an area exposed to the outside of the display 180 based on the result value output by at least one AI engine, and output the result value in the changed display area.

Figure 18:
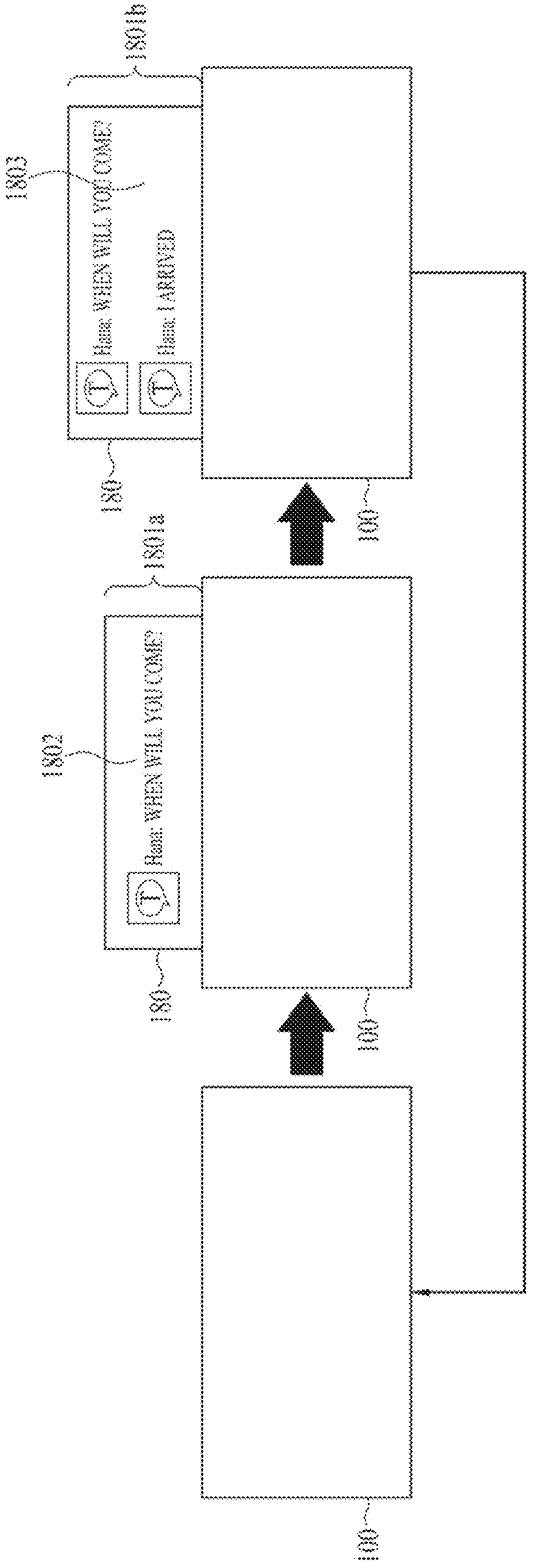
FIG. 18 is a diagram illustrating an embodiment in which a display device according to an embodiment of the present disclosure receives a message.

FIG. 18 is a diagram illustrating an embodiment in which a display device according to an embodiment of the present disclosure receives a message. Hereinafter, a description of content that is redundant with the above-mentioned content will be omitted.

Referring to FIG. 18, the display device 100 may receive a first message 1802 from an external terminal. When receiving the first message 1802 from the external terminal, the display device 100 with the display 180 in a hidden view state may change the mode of the display 180 to a first partial view 1801*a*.

The display device 100 may output the first message 1802 in the first partial view 1801*a* of the display 180. Thereafter, the display device 100 may receive a second message 1803 from an external terminal. In this regard, the external terminal that transmitted the second message 1803 may correspond to the same terminal as the external terminal that transmitted the first message 1802.

When receiving the first message 1802 and the second message 1803 from the external terminal, the display device 100 may change the mode of the display 180 to a second partial view 1801*b* and output the first message 1802 and the second message 1803 in the second partial view 1801*b*.

In other words, the display device 100 may change the size of the display 180 based on the number of messages received from the external terminal.

Figure 19:
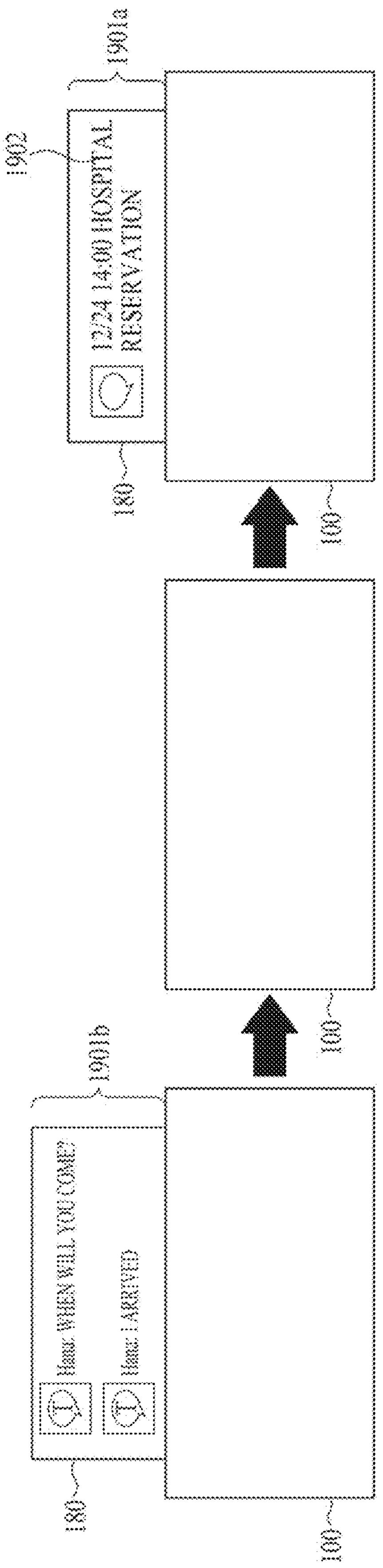
FIG. 19 is a diagram illustrating another embodiment in which a display device according to an embodiment of the present disclosure receives a message.

FIG. 19 is a diagram illustrating another embodiment in which a display device according to an embodiment of the present disclosure receives a message. Hereinafter, a description of content that is redundant with the above-mentioned content will be omitted.

Referring to FIG. 19, the display device 100 may change the mode of the display 180 to a hidden view when the first time period elapses after the first message and the second message described above in FIG. 18 are output. In this regard, the first time period may be determined by the display device 100 or by the external terminal that transmitted the first message and the second message.

In addition, when receiving a third message 1902 from a second external terminal after the first message and the second message described above in FIG. 18 are output, the display device 100 may change the mode of the display 180 to the hidden view and change the mode to a first partial view 1901*a* again. Thereafter, the display device 100 may output the third message 1902 in the first partial view 1901*a*.

In other words, while the display device 100 lifts the display 180 upward and outputs the message in the display area when receiving the message from the same external terminal, the display device 100 may change the mode of the display 180 to the hidden view to remove the existing messages (the first message and the second message), and change the mode to the first partial view 1901*a* again to output the third message 1902 when receiving the message from another external terminal.

In addition, even when the message is received from the same external terminal, when a platform that transmits the message changes, the display device 100 may change the mode of the display 180 to the hidden view to remove the existing message, and then change the mode to the first partial view 1901*a* again to output the new message. For example, when receiving a text message from a first external terminal, the display device 100 may output the text message in the first partial view 1901*a*. Thereafter, when receiving an instant message from the first external terminal, the display device 100 may change the mode of the display 180 to the hidden view and then change the mode to the first partial view 1901*a* again to output the instant message in the first partial view 1901*a*.

Figure 20:
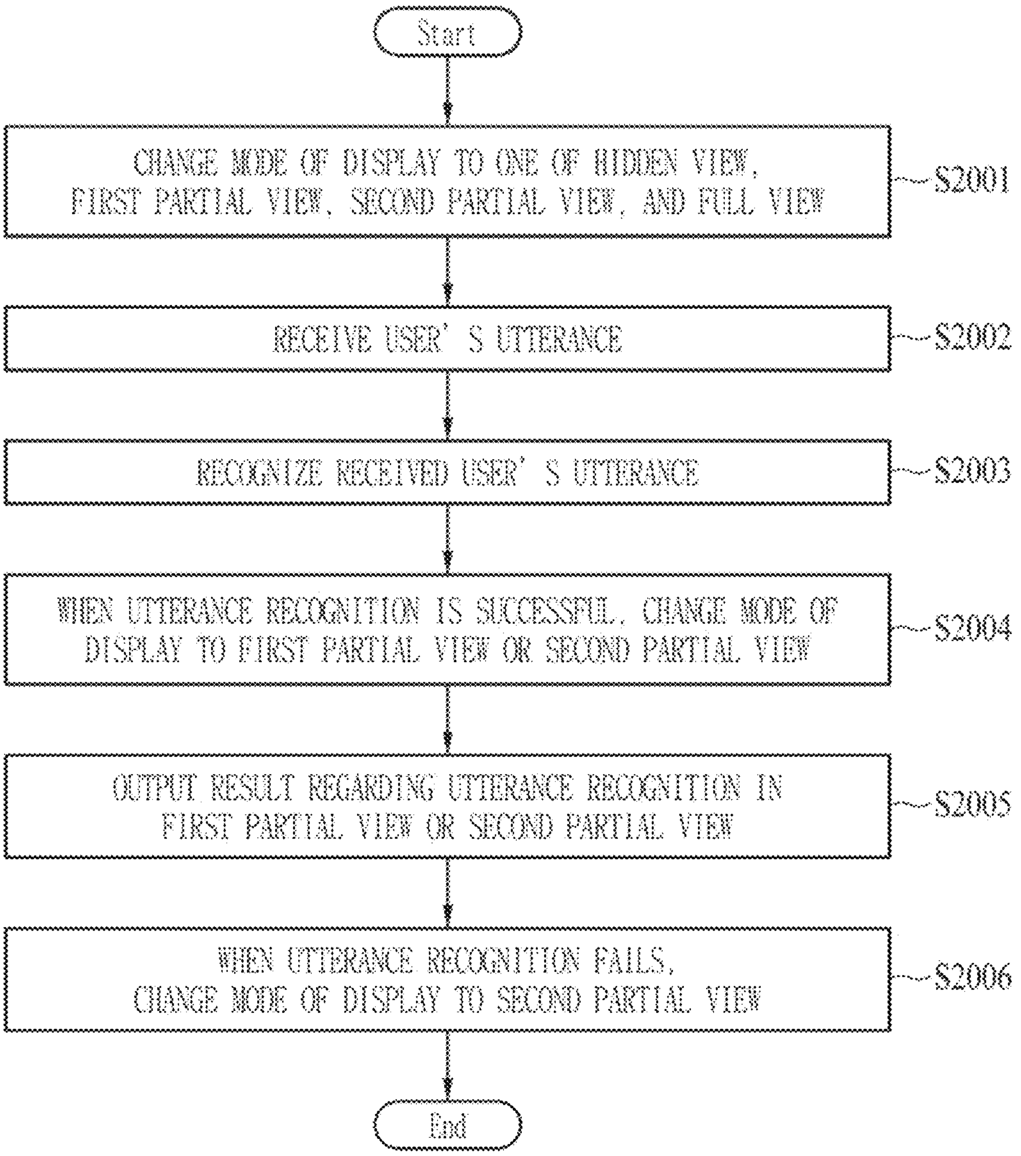
FIG. 20 is a flowchart illustrating a method for controlling a display device according to an embodiment of the present disclosure.

FIG. 20 is a flowchart illustrating a method for controlling a display device according to an embodiment of the present disclosure. Hereinafter, a description of content that is redundant with the above-mentioned content will be omitted.

Referring to FIG. 20, in step S2001, the display device may change the mode of the display to one of the hidden view, the first partial view, the second partial view, and the full view. In this regard, the hidden view refers to the state in which the display area of the display is not exposed to the outside, the first partial view refers to the state in which the first area of the display area is exposed to the outside, the second partial view refers to the state in which the second area of the display area is exposed to the outside, and the full view refers to the state in which the display area is maximally exposed to the outside. Additionally, the second area is wider than the first area.

In step S2002, the display device may receive the user's utterance.

In step S2003, the display device may recognize the received user's utterance.

In step S2004, when the utterance recognition is successful, the display device may change the mode of the display to the first partial view or the second partial view. Additionally, when the recognized user's utterance includes the program title, the display device may search for the program title. Additionally, when the recognized user's utterance includes the weather, the display device may search for the weather.

In step S2005, the display device may output the result regarding the utterance recognition in the first partial view or the second partial view. Additionally, the display device may output the search results in the first partial view or the second partial view.

In step S2006, when the utterance recognition fails, the display device may change the mode of the display to the second partial view.

Additionally, the display device may receive the control signal of selecting the first search result among the search results. The display device may change the mode of the display to the full view based on the control signal, and output the content corresponding to the first search result in the full view.

Additionally, when outputting the information on the weather in the first partial view, the display device may output the audio content related to the weather in the second partial view.

The embodiments described above with reference to FIGS. 1 to 19 may be implemented with the method for controlling the display device as shown in FIG. 20. That is, although FIGS. 1 to 19 are described as being performed by the display device for convenience of description, all of the embodiments may be implemented using the method for controlling the display device.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

[Mode for Invention]

In the previous section titled "Best Mode," various embodiments of the present disclosure have been described, and it is understood that combining embodiments depicted in two or more drawings, as needed by those skilled in the art, also falls within the scope of the present disclosure.

INDUSTRIAL APPLICABILITY

The present disclosure is applicable to a display device of various form factors, and thus industrially applicable.

What is claimed is:

1. A display device comprising:

a microphone configured to receive an utterance of a user;

a communicator configured to achieve communication with the outside;

a display including a display area to output content;

a motor configured to control the display to expose a partial area of the display area to the outside; and a controller configured to control the communicator, the display, and the motor, wherein the controller is configured to:

change a mode of the display to one of a hidden view, a first partial view, a second partial view, and a full view;

recognize the received user's utterance;

when the utterance recognition is successful, change the mode of the display to the first partial view, and output a result regarding the utterance recognition in the first partial view; and when the utterance recognition fails, change the mode of the display to the second partial view, and output a virtual keyboard in the second partial view, wherein the hidden view is a state where the display area is not exposed to the outside, the first partial view is a state where a first area of the display area is exposed to the outside, the second partial view is a state where a second area of the display area is exposed to the outside, and the full view is a state where the display area is maximally exposed to the outside, and wherein the second area is wider than the first area.

2. The display device of claim 1, wherein the controller is configured to:

when the recognized user's utterance includes a name of a device, transmit a control signal corresponding to the recognized user's utterance to the device;

change the mode of the display to the first partial view; and output a message corresponding to the control signal in the first partial view.

3. The display device of claim 1, wherein the controller is configured to:

when the recognized user's utterance includes a program title, search for the program title;

change the mode of the display to the second partial view; and output search results in the second partial view.

4. The display device of claim 3, wherein the controller is configured to:

receive a control signal of selecting a first search result among the search results;

change the mode of the display to the full view; and output first content corresponding to the first search result in the full view.

5. The display device of claim 1, wherein the controller is configured to:

when the recognized user's utterance includes weather, change the mode of the display to the first partial view;

output information on the weather in the first partial view;

change the mode of the display to the second partial view; and output audio content related to the weather in the second partial view.

6. The display device of claim 1, wherein the controller is configured to:

when the recognized user's utterance includes a person's name, change the mode of the display to the first partial view;

output information on the person's name in the first partial view;

change the mode of the display to the second partial view; and display a content list related to the person's name in the second partial view.

7. The display device of claim 1, wherein the controller is configured to:

when performing a voice call with a first external terminal, change the mode of the display to the first partial view; and output voice call information in the first partial view.

8. The display device of claim 7, wherein the controller is configured to:

when performing a video call with the first external terminal, change the mode of the display to the second partial view; and output video call information in the second partial view.

9. The display device of claim 8, wherein the controller is configured to:

when performing a video conference with a plurality of external terminals, change the mode of the display to the full view; and output video conference information in the full view.

10. The display device of claim 1, wherein the controller is configured to:

when receiving a first message from a second external terminal, change the mode of the display to the first partial view;

output the first message in the first partial view;

when receiving a second message from the second external terminal after outputting the first message, change the mode of the display to the second partial view; and output the first message and the second message in the second partial view.

11. The display device of claim 10, wherein the controller is configured to, when a first time period elapses after the first message and the second message are output, change the mode of the display to the hidden view.

12. The display device of claim 10, wherein the controller is configured to:

when a third message is received from a third external terminal after the first message and the second message are output, change the mode of the display to the hidden view;

change the mode of the display to the first partial view; and output the third message in the first partial view.

13. A method for controlling a display device including a display with a display area exposed to the outside changeable in size, the method comprising:

changing a mode of the display to one of a hidden view, a first partial view, a second partial view, and a full view;

receiving utterance of a user;

recognizing the received user's utterance;

when the utterance recognition is successful, changing the mode of the display to the first partial view;

outputting a result regarding the utterance recognition in the first partial view;

when the utterance recognition fails, changing the mode of the display to the second partial view; and outputting a virtual keyboard in the second partial view, wherein the hidden view is a state where the display area is not exposed to the outside, the first partial view is a state where a first area of the display area is exposed to the outside, the second partial view is a state where a second area of the display area is exposed to the outside, and the full view is a state where the display area is maximally exposed to the outside, and wherein the second area is wider than the first area.

* * * * *